(12) United States Patent
Tsubaki et al.

(10) Patent No.: US 8,982,219 B2
(45) Date of Patent: Mar. 17, 2015

(54) RECEIVING DEVICE AND CAMERA SYSTEM

(75) Inventors: Satoshi Tsubaki, Kanagawa (JP); Tamotsu Munakata, Kanagawa (JP); Hideaki Murayama, Kanagawa (JP); George Fujita, Kanagawa (JP); Kei Kakitani, Kanagawa (JP)

(73) Assignee: Sony Corporation, Tokyo (JP)

(*) Notice: Subject to any disclaimer, the term of this patent is extended or adjusted under 35 U.S.C. 154(b) by 744 days.

(21) Appl. No.: 13/375,866

(22) PCT Filed: Mar. 30, 2011

(86) PCT No.: PCT/JP2011/058006
§ 371 (c)(1),
(2), (4) Date: Dec. 2, 2011

(87) PCT Pub. No.: WO2011/125737
PCT Pub. Date: Oct. 13, 2011

(65) Prior Publication Data
US 2012/0086814 A1   Apr. 12, 2012

(30) Foreign Application Priority Data

Apr. 9, 2010 (JP) ............................ P2010-090033
Nov. 10, 2010 (JP) ............................ P2010-251957

(51) Int. Cl.
| G06F 15/16 | (2006.01) |
| H04N 21/2187 | (2011.01) |
| H04N 5/247 | (2006.01) |
| H04N 21/43 | (2011.01) |

(Continued)

(52) U.S. Cl.
CPC ........... *H04N 21/2187* (2013.01); *H04N 5/247* (2013.01); *H04N 21/4305* (2013.01); *H04N 21/6125* (2013.01)
USPC ......................... 348/192; 709/233

(58) Field of Classification Search
USPC .......................................................... 348/192
See application file for complete search history.

(56) References Cited

U.S. PATENT DOCUMENTS

| 6,370,666 B1 * | 4/2002 | Lou et al. ....................... 714/751 |
| 7,712,122 B2 * | 5/2010 | Lin et al. ....................... 725/105 |
| 8,488,965 B2 * | 7/2013 | Mizutani et al. ................ 398/66 |

(Continued)

FOREIGN PATENT DOCUMENTS

| DE | 102004007098 | 9/2004 |
| EP | 1 339 182 | 8/2003 |

(Continued)

*Primary Examiner* — Sath V Perungavoor
*Assistant Examiner* — Howard D Brown, Jr.
(74) *Attorney, Agent, or Firm* — Frommer Lawrence & Haug LLP; William S. Frommer

(57) ABSTRACT

A transmitting device in accordance with the present invention includes an encoding unit that converts an input video signal into encoded data and sends out the encoded data to a transmission line, and a synchronization signal generation unit that generates a synchronization signal SYNC for adjusting the phase of an input video signal on the basis of phase information transmitted through the transmission line, wherein the phase information PHS includes information indicating that a timing of a synchronization signal generated by the synchronization signal generation unit is to be advanced by the time necessary for transmission, and the synchronization signal generation unit generates the synchronization signal SYNC so that an input video signal is advanced by the time necessary for transmission.

15 Claims, 14 Drawing Sheets

(51) Int. Cl.
*H04N 21/61* (2011.01)
*H04N 5/04* (2006.01)

(56) References Cited

U.S. PATENT DOCUMENTS

| | | | |
|---|---|---|---|
| 2004/0227855 A1* | 11/2004 | Morel et al. | 348/512 |
| 2006/0246935 A1* | 11/2006 | Iochi et al. | 455/522 |
| 2008/0063078 A1* | 3/2008 | Futenma et al. | 375/240.19 |
| 2008/0212480 A1* | 9/2008 | Shimonishi | 370/236 |
| 2011/0123170 A1* | 5/2011 | Kure | 386/241 |
| 2012/0166670 A1* | 6/2012 | Kure et al. | 709/233 |

FOREIGN PATENT DOCUMENTS

| | | |
|---|---|---|
| EP | 1450555 | 8/2004 |
| GB | 2398956 | 9/2004 |
| JP | 1-255382 | 10/1989 |
| JP | 11-275461 | 10/1999 |
| JP | 11-275641 | 10/1999 |
| JP | 2004-343697 | 12/2004 |
| JP | 2005-57590 | 3/2005 |
| JP | 2006-217384 | 8/2006 |
| JP | 2006-325020 | 11/2006 |
| JP | 2008-28541 | 2/2008 |
| JP | 2010-171633 | 8/2010 |

* cited by examiner

OPERATION FLOWCHART AT BOOTING

RECEIVING DEVICE AND CAMERA SYSTEM

TECHNICAL FIELD

The present invention relates to a receiving device and a camera system for transmitting video.

BACKGROUND ART

In recent years, low-delay video transmission is demanded for live broadcast and the like.

As a transmission line, transmission through an asynchronous communication line such as a LAN, the Internet, or an IP network like a NGN is demanded from a cost perspective and the like.

In response to such demand, a line-based cosec is proposed as a low-delay codec (for example, see Patent Literature 1).

In regard to a multi-camera-based system camera or VTR, a receiving device is provided with a synchronization signal input in order to synchronize the output phase of each appliance. Thus, an output video signal needs to be synchronized with the synchronization signal.

CITATION LIST

Patent Literature

Patent Literature 1: JP 2008-028541A
Patent Literature 2: JP 2006-325020A
Patent Literature 3: JP H11-275461A
Patent Literature 4: JP H01-255382A
Patent Literature 5: JP 2006-217384A
Patent Literature 6: JP H11-275461A

SUMMARY OF INVENTION

Technical Problem

However, when an appliance A, which is a video supply source (e.g., a camera or a VTR), does not correspond to an appliance B, which is an input destination of a synchronization signal input, if video is transferred between the two appliances, an output video signal output from the appliance B will not be correctly synchronized with the synchronization signal unless a transmission delay is taken into consideration.

As an example therefor, a system including a camera as the appliance A and including a camera control unit (CCU) as the appliance B is given. In order to correctly synchronize output video with a synchronization signal, there is known a technique of, when a camera control unit and a camera are connected, advancing the phase of a synchronization signal within the camera by the amount of delays caused by a cable and the like to thereby synchronize a video output with a synchronization signal input to the camera control unit (for example, see Patent Literature 4 and 5).

However, such technique would not be able to be used when the appliance A and the appliance B are connected via an asynchronous transmission line. This is because, in an asynchronous transmission line, transmission delays are not constant and have variations, and such variations should be absorbed. If variations in the transmission delay are not taken into consideration, a phenomenon would occur that, upon increase in the amount of delays, video information will not reach the appliance B even when a time is reached when video should be output, and thus the video will be distorted.

When codec data is transmitted using an asynchronous communication line such as an IP network, many unstable delay elements are included such as jitter in the codec and jitter in the transmission line.

Therefore, there is proposed a technique of, in order to perform stable decoding, providing a buffer in a data area and performing synchronization (for example, see Patent Literature 2).

However, with the technique disclosed in Patent Literature 2 above, although it is possible to obtain a stable video output, it is impossible to obtain video that is synchronized with a reference synchronization signal input.

Therefore, in order to obtain output video of a decoder that is synchronized with a reference synchronization signal input, a technique of synchronizing video using a frame buffer is needed (for example, see Patent Literature 3).

When a frame buffer is thus used to synchronize the output phase of the decoder with the phase of the phase signal input, a delay of about one frame would be generated in the frame buffer.

In particular, such a delay in the frame buffer is a nonnegligible, large delay for a low-delay video transmission device that uses a low-delay codec whose codec delay amount is several lines. Thus, such a delay is a big problem for a low-delay transmission system whose biggest feature is a low delay.

Further, if synchronization is performed when the appliance A and the appliance B are connected via an asynchronous transmission line, there is a problem in that, with the method described in Patent Literature 3, a delay time of from the video output of the appliance A to the video output of the appliance B would not be able to be adjusted to an intended value.

Furthermore, when the length of time for which video signals are stored in a buffer is too short, then variations in the transmission delay would not be able to be accommodated, and thus, output video can be distorted in the event of a buffer underflow or overflow.

The present invention has been made in view of the foregoing problems, and it is an object of the present invention to provide a receiving device and a camera system that are novel and improved and are capable of accommodating jitter of a transmission delay of an asynchronous transmission line, and are capable of obtaining a video output that is synchronized with a synchronization signal input.

Solution to Problem

In order to solve the aforementioned problems, according to one aspect of the present invention, there is provided a receiving device including a decoding unit that decodes encoded data of video transmitted through a transmission line, a synchronization output unit that synchronizes video data decoded by the decoding unit with a reference synchronization signal, and outputs the video data, a transmission delay information acquisition unit that acquires information related to a delay of the transmission line from the input encoded data and time information, and a synchronization signal transmission unit that determines phase information for controlling a phase of the input reference synchronization signal on the basis of the information obtained by the transmission delay information acquisition unit, and transmits the phase information through the transmission line.

The transmission delay information acquisition unit may include a transmission delay measuring unit that measures a delay time of the transmission line, and the synchronization signal transmission unit may determine a time necessary for transmission from the delay time obtained by the transmission delay measuring unit, and determine the phase information for generating a synchronization signal that is advanced relative to the input reference signal by the time necessary for transmission.

The encoded data may have time information added thereto, the time information having been sent out to the transmission line. The transmission delay measuring unit may, on the basis of the time information added to the encoded data and time information of when the encoded data was received, perform a process of measuring the delay time of the transmission line a plurality of times, and perform statistical processing on a set of the plurality of measured delay times to determine the time necessary for transmission as an allowable transmission delay time. The synchronization signal transmission unit may set the allowable transmission delay time as a phase difference of the synchronization signal as the time necessary for transmission, convert the input reference synchronization signal into time, and transmit time information as the phase information through the transmission line, the time information being for generating a synchronization signal that is advanced by the time of the phase difference necessary for transmission.

At least the transmission line and the decoding unit may form a codec unit, and a delay amount of the codec unit may be preset as a codec delay amount. The synchronization signal transmission unit may determine as the time necessary for transmission a summed time of the allowable transmission delay time obtained by the transmission delay measuring unit and the codec delay amount, determine the phase information for generating a synchronization signal that is advanced relative to the input reference synchronization signal by the time necessary for transmission, and transmit the phase information through the transmission line.

The encoded data may have time information added thereto, the time information having been sent out to the transmission line. The transmission delay measuring unit may, on the basis of the time information added to the encoded data and time information of when the encoded data was received, perform a process of measuring the delay time of the transmission line a plurality of times, and perform statistical processing on a set of the plurality of measured delay times to determine an allowable transmission delay time as the time necessary for transmission. The synchronization signal transmission unit may set the summed time of the allowable transmission delay time and the preset codec delay amount as a phase difference of the synchronization signal as the time necessary for transmission, convert the input reference synchronization signal into time, and transmit time information as the phase information through the transmission line, the time information being for generating a synchronization signal that is advanced by the time of the phase difference necessary for transmission.

The synchronization signal transmission unit may record time of the input reference synchronization signal for each synchronization pulse, and send out the time to the transmission line.

The receiving device may further include a phase control amount calculation unit that determines, on the basis of the information obtained by the transmission delay information acquisition unit, a phase control amount for controlling the phase of the input reference synchronization signal. The synchronization signal transmission unit may, on the basis of the phase control amount, controls the phase of the reference synchronization signal, and transmit the controlled phase information through the transmission line.

The receiving device may further include a statistics calculation unit that calculates statistical information of the information related to a delay of the transmission line. The phase control amount calculation unit may determine the phase control amount on the basis of the statistical information.

The receiving device may further include a statistics calculation unit that calculates statistical information of the information related to a delay of the transmission line, a display unit that displays the statistical information, and an operation unit that acquires an operation amount input on the basis of a display of the display unit. The phase control amount calculation unit may determine the phase control amount on the basis of the statistical information and the operation amount.

The synchronization signal transmission unit may include a phase controller that controls the phase of the reference synchronization signal on the basis of the phase control amount, and the phase controller may control the phase of the reference synchronization signal such that a target phase control amount is attained instantaneously.

The synchronization signal transmission unit may include a phase controller that controls the phase of the reference synchronization signal on the basis of the phase control amount, and the phase controller may control the phase of the reference synchronization signal such that a target phase control amount is attained in a stepwise manner.

The information related to a delay of the transmission line may be a delay time of the transmission line or a usage rate of a buffer that stores the encoded data.

In order to solve the aforementioned problems, according to another aspect of the present invention, there is provided a camera system including an imaging unit that performs imaging to obtain a video signal, a transmission line, a transmitting device that sends out to the transmission line encoded data of the video signal obtained by imaging with the imaging unit; and a receiving device that receives the encoded data. The transmitting device may include an encoding unit that converts an input video signal into encoded data, and sends out the encoded data to the transmission line, and a synchronization signal generation unit that generates, on the basis of phase information transmitted through the transmission line, a synchronization signal for adjusting a phase of an input video signal obtained by the imaging unit. The phase information may include information indicating that a timing of a synchronization signal generated by the synchronization signal generation unit is to be advanced by a time necessary for transmission. The synchronization signal generation unit may generate the synchronization signal so that an input video signal is advanced by the time necessary for transmission. The receiving device may include a decoding unit that decodes the encoded data of video transmitted through the transmission line, a synchronization output unit that synchronizes video data decoded by the decoding unit with a reference synchronization signal and outputs the video data, a transmission delay information acquisition unit that acquires information related to a delay of the transmission line from the input encoded data and time information, and a synchronization signal transmission unit that determines phase information for controlling a phase of the input reference synchronization signal on the basis of the information obtained by the transmission delay information acquisition unit, and transmits the phase information through the transmission line.

The phase information may include information indicating that a timing of a synchronization signal generated by the synchronization signal generation unit is to be advanced by a time necessary for transmission. The synchronization signal generation unit may generate the synchronization signal so that an input video signal is advanced by the time necessary for transmission. The transmission delay information acquisition unit may include a transmission delay measuring unit that measures a delay time of the transmission line. The synchronization signal transmission unit may determine the time necessary for transmission from the delay time obtained by the transmission delay measuring unit, and determine the phase information for generating a synchronization signal that is advanced relative to the input reference signal by the time necessary for transmission.

The transmitting device may further include a time information adding unit that adds to the encoded data time information to be sent out to the transmission line. The transmission delay measuring unit of the receiving device may, on the basis of the time information added to the encoded data and time information of when the encoded data was received, perform a process of measuring the delay time of the transmission line a plurality of times, and perform statistical processing on a set of the plurality of measured delay times to determine the time necessary for transmission as an allowable transmission delay time. The synchronization signal transmission unit may set the allowable transmission delay time as a phase difference of the synchronization signal as the time necessary for transmission, convert the input reference synchronization signal into time, and transmit time information as the phase information to the transmitting device through the transmission line, the time information being for generating a synchronization signal that is advanced by the time of the phase difference necessary for transmission. The synchronization signal generation unit of the transmitting device may, on the basis of the time information, set the phase of the generated synchronization signal to be advanced.

The encoding unit, the transmission line, and the decoding unit may form a codec unit, and a delay amount of the codec unit may be preset as a codec delay amount. The synchronization signal transmission unit may determine as the time necessary for transmission a summed time of the allowable transmission delay time obtained by the transmission delay measuring unit and the codec delay amount, determine the phase information for generating a synchronization signal that is advanced relative to the input reference synchronization signal by the time necessary for transmission, and transmit the phase information through the transmission line.

The transmitting device may further include a time information adding unit that adds to the encoded data time information to be sent out to the transmission line. The transmission delay measuring unit of the receiving device may, on the basis of the time information added to the encoded data and time information of when the encoded data was received, perform a process of measuring the delay time of the transmission line a plurality of times, and perform statistical processing on a set of the plurality of measured delay times to determine an allowable transmission delay time as the time necessary for transmission. The synchronization signal transmission unit may set the summed time of the allowable transmission delay time and the preset codec delay amount as a phase difference of the synchronization signal as the time necessary for transmission, convert the input reference synchronization signal into time, and transmit time information as the phase information to the transmitting device through the transmission line, the time information being for generating a synchronization signal that is advanced by the time of the phase difference necessary for transmission. The synchronization signal generation unit of the transmitting device may, on the basis of the time information, set the phase of the generated synchronization signal to be advanced.

The receiving device may further include a phase control amount calculation unit that determines, on the basis of the information obtained by the transmission delay information acquisition unit, a phase control amount for controlling the phase of the input reference synchronization signal. The synchronization signal transmission unit may control the phase of the reference synchronization signal on the basis of the phase control amount, and transmit the controlled phase information through the transmission line.

The receiving device may further include a statistics calculation unit that calculates statistical information of the information related to a delay of the transmission line. The phase control amount calculation unit may determine the phase control amount on the basis of the statistical information.

The receiving device may further include a statistics calculation unit that calculates statistical information of the information related to a delay of the transmission line, a display unit that displays the statistical information, and an operation unit that acquires an operation amount input on the basis of a display of the display unit. The phase control amount calculation unit may determine the phase control amount on the basis of the statistical information and the operation amount.

Advantageous Effects of Invention

According to the present invention, low-delay video transmission can be realized that can accommodate jitter of a transmission delay of an asynchronous transmission line, and can obtain a video output that is synchronized with a synchronization signal input.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Note that the description will be given in the following order.

Figure 1:
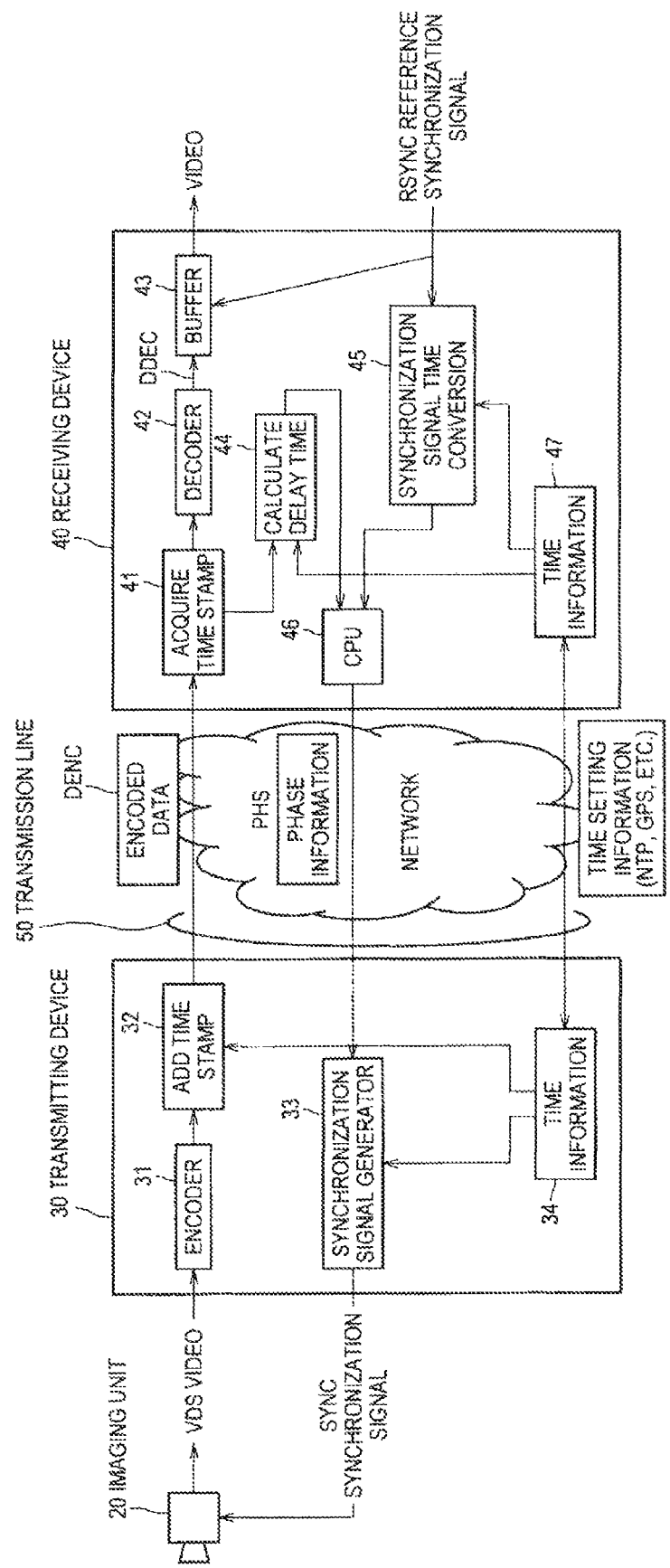
FIG. 1 is a diagram showing a configuration example of a camera system that adopts a video transmission device in accordance with an embodiment of the present invention.

First Embodiment
1. Summary of Overall Configuration of Camera System Including Video Transmission Device
2. Configuration Example of Transmitting Device
3. Configuration Example of Receiving Device
4. Exemplary Operation at Booting
Second Embodiment
1. Overall Configuration of Camera System
2. Example of Statistical Information
3. Adjustment of Phase Advancing Amount based on Statistical Information
4. Process Procedures of System of This Embodiment First Embodiment 1. Summary of Overall Configuration of Camera System Including Video Transmission Device FIG. 1 is a diagram showing a configuration example of a camera system that adopts a video transmission device in accordance with the first embodiment of the present invention.

This camera system 10 includes an imaging unit 20, a transmitting device 30, a receiving device 40, and a transmission line 50.

The transmitting device 30, the receiving device 40, and the transmission line 50 constitute the video transmission device.

The transmission line 50 is used for signal transmission between the transmitting device 30 and the receiving device 40.

In this embodiment, the transmission line 50 is assumed to be an asynchronous transmission line such as a LAN, the Internet, or an IP network like a NGN. Note that an asynchronous transmission line has fluctuations in the transmission time, and such time is referred to as jitter.

In this embodiment, signals transmitted through the transmission line 50 are packetized, for example.

The camera system 10 in this embodiment is configured with the following features.

Figure 2:
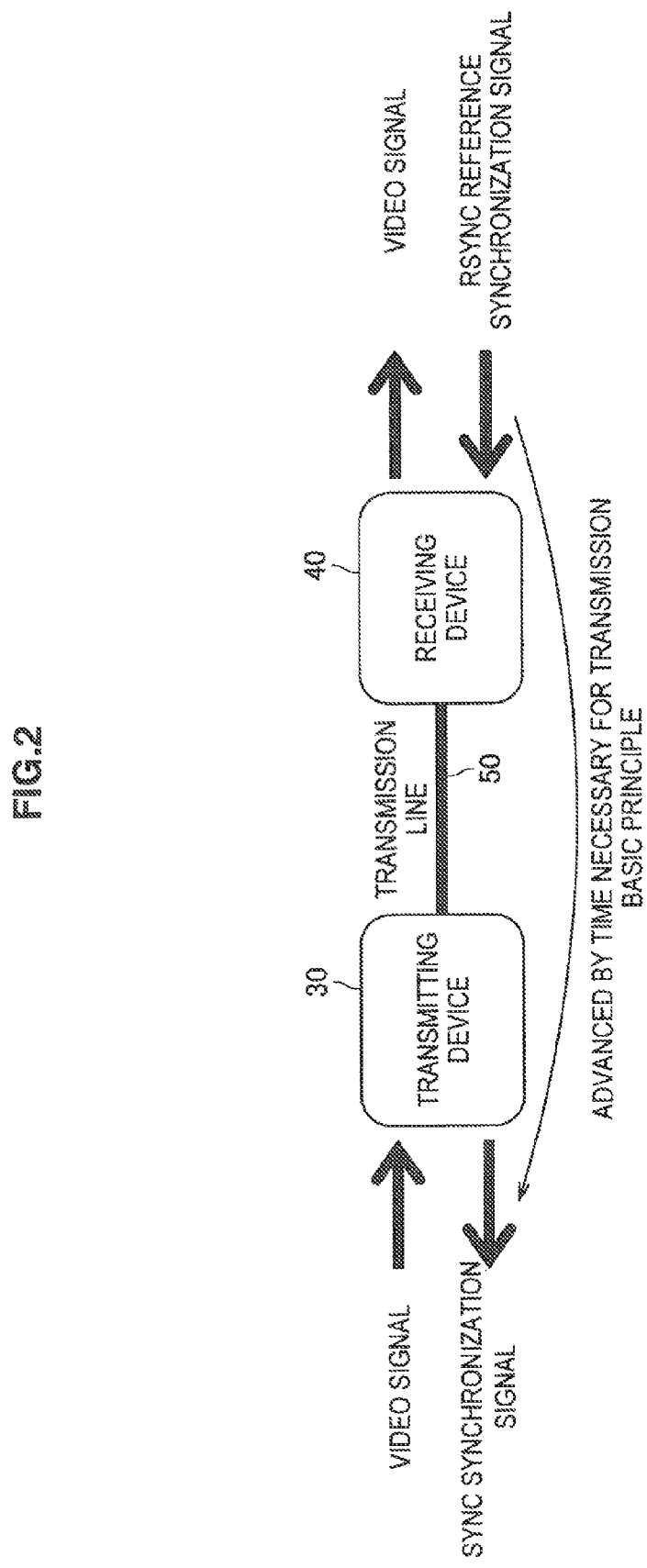
FIG. 2 is a diagram for illustrating the basic principle of advancing generation of a synchronization signal by the time necessary for transmission on the transmitting device side in the embodiment.

In the camera system 10, basically, as shown in FIG. 2, a synchronization signal SYNC is output from the transmitting device 30, and the phase of the synchronization signal SYNC is controlled, whereby the phase of a video signal obtained by the imaging unit 20 and input to the transmitting device 30 is controlled.

The timing of the synchronization signal SYNC output from the transmitting device 30 is advanced relative to a reference synchronization signal RSNYC input to the receiving device 4 by the delay amount necessary for transmission, whereby input video is advanced by the delay time necessary for transmission.

Accordingly, the camera system 10 can obtain decoded video that is synchronized with the reference synchronization signal RSYNC input to the receiving device 40.

Further, the camera system 10 is combined with a function of measuring the amount of delays generated in the transmission line 50, and the minimum delay amount (the allowable transmission delay time) is calculated, whereby low-delay video transmission is realized. Note that the allowable transmission delay time corresponds to the maximum allowable value of a transmission delay, and corresponds to the sum of the transmission delay time (the transmission delay amount) of the asynchronous network and the time for waiting in the buffer 400 that absorbs jitter of the asynchronous network.

The reason for adopting the aforementioned configuration is as follows.

In the existing video transmission devices, input video has a free phase. Thus, video that is delayed by a delay time, which is generated in encoding, transmitting, and decoding the video, is configured to be output from a video output of a receiver.

When such a configuration is used, even if the amount of delays generated in the encoding and the decoding is suppressed to a low level using a low-delay codec for the purpose of transmitting low-delay video, it has been necessary to use more buffer than the amount of the actually needed buffer in order to absorb transmission jitter in the asynchronous transmission line.

This is because it is necessary to allow for a margin as the amount of transmission jitter in an asynchronous transmission line such as an IP network is unknown.

Figure 3:
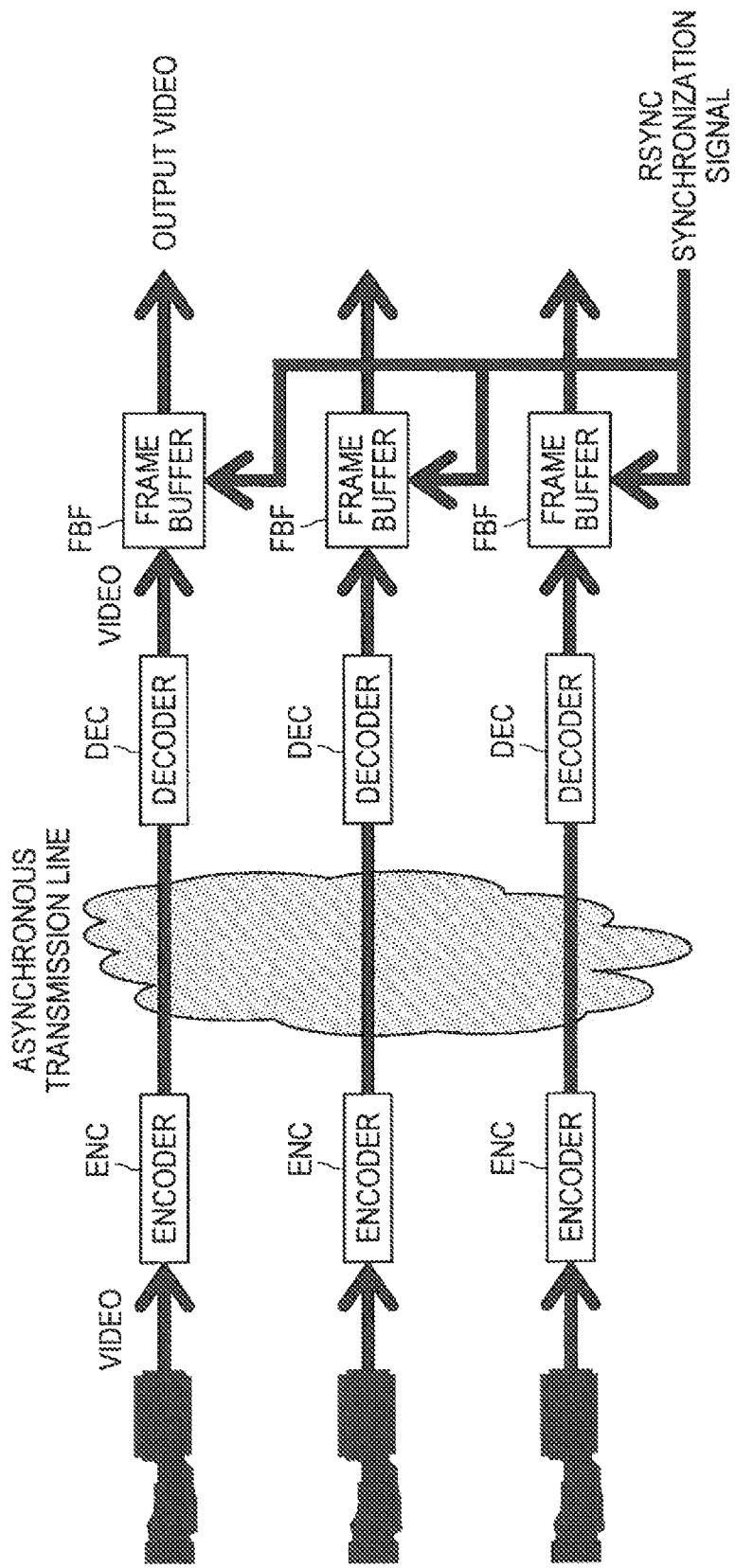
FIG. 3 is a diagram for illustrating problems of the existing video transmission devices.

Further, when it is necessary to synchronize output video from a receiving device with a reference synchronization signal RSYNC such as when video of a plurality of cameras is input to a switcher, as shown in FIG. 3, frame buffers FBF for synchronizing the video should be provided on the rear stages of decoders DEC. A delay caused by such frame buffers FBF will be a nonnegligible, large delay for low-delay transmission.

Thus, in this embodiment, the timing of a synchronization signal SYNC output from the transmitting device 30 is advanced relative to a reference synchronization signal RSYNC input to the receiving device 40 by the delay amount necessary for transmission, whereby input video is advanced by the delay time necessary for transmission.

Accordingly, the camera system 10 can obtain decoded video that is synchronized with the reference synchronization signal RSNYC input to the receiving device 40, and is configured such that it is combined with a function of measuring the amount of delays generated in the transmission line 50, so that an optimum delay amount is determined to realize low-delay video transmission.

Hereinafter, the configurations and functions of the imaging unit 20, the transmitting device 30, and the receiving device 40 that form the camera system 10 with the aforementioned features will be specifically described.

[1. Configuration of Imaging Unit 20]

The imaging unit 20 includes an image pickup device such as a CCD or a CMOS image sensor, and a signal processing circuit that applies camera signal processing to a signal that has been subjected to photoelectric conversion at the image pickup device.

The imaging unit 20 outputs a video signal VDS obtained through imaging to the transmitting device 30.

The imaging unit 20 has a synchronization signal input, and has a function of synchronizing the output phase of the video signal VDS with the synchronization signal input by adjusting the imaging timing of the image sensor.

Note that the video signal VDS includes a video signal and an audio signal.

<2. Configuration Example of Transmitting Device 30>

The transmitting device 30 includes an encoder 31 as an encoding unit, a time stamp adding unit 32 as a time information adding unit, a synchronization signal generation unit 33, and a time information storage unit 34.

The encoder 31 converts the input video signal VDS into encoded data, and outputs the encoded data to the time stamp adding unit 32.

The time stamp adding unit 32, with reference to time information in the time information storage unit 34, adds to the encoded data the time information to be sent out to the transmission line 50 as a time stamp, and transmits encoded data DENC with the added time stamp to the transmission line 50.

The synchronization signal generation unit 33, on the basis of phase information that has been sent out from the receiving device 40 and transmitted through the transmission line 50, generates a synchronization signal SNYC for the imaging unit 20 with reference to the time information in the time information storage unit 34. The imaging unit 20 adjusts the imaging timing, thereby outputting a video signal VDS in phase with the input synchronization signal SNYC to the transmitting device 30. Accordingly, the phase of the video signal VDS input to the transmitting device 30 is adjusted.

Herein, the phase information PHS includes information indicating that the timing of the synchronization signal SYNC generated by the synchronization signal generation unit 33 is to be advanced by the time necessary for transmission.

The phase information PHS is transmitted through the transmission line 50 as time information, which is obtained by converting the reference synchronization signal RSYC input to the receiving device 40 into time, for generating a synchronization signal SYNC that is advanced by the time of a phase difference necessary for transmission.

The phase information will be described in further detail below.

The synchronization signal generation unit 33, on the basis of such phase information PHS, generates a synchronization signal SNYC so that an input video signal VDS will be advanced by the time necessary for transmission.

The synchronization signal generation unit 33 creates the synchronization signal SYNC by creating pulses of time information on the basis of the time information included in the phase information PHS, and sets the phase of the generated synchronization signal SNYC to be advanced.

In this embodiment, the time information storage unit 34 of the transmitting device 30 has time information independently of the receiving device 40. This time is information such as the date and time unified in the world. It is possible to set the time to the right time using a technique such as a NTP (Network Time Protocol), GPS (Global Positioning System), or RTC (Real TimeClock). Accordingly, time information 47 of the receiving device 40 and the time of the time information 34 are adjusted such that they become close to each other.

<3. Configuration Example of Receiving Device 40>

The receiving device 40 includes a time stamp acquisition unit 41, a decoder 42 as a decoding unit, a buffer 43 as a synchronization output unit, a delay time calculation unit 44, a synchronization signal time conversion unit 45, a CPU 46 as a control unit, and a time information storage unit 47.

The time stamp acquisition unit 41 and the delay time calculation unit 44 constitute a transmission delay information acquisition unit (a transmission delay measuring unit).

In addition, the synchronization signal time conversion unit 45 and the CPU. 46 constitute a synchronization signal transmission unit.

Further, in this embodiment, the encoder 31 and the time stamp adding unit 32 of the transmitting device 30, the transmission line 50, the time stamp acquisition unit 41, and the decoder 42 form a codec unit.

Note that a basic codec unit is formed even when the time stamp adding unit 32 and the time stamp acquisition unit 41 are not included.

Low-delay video transmission is realized by using a low-delay codec such as LLVC. The amount of delays in the codec unit is referred to as a "codec delay amount," and it changes according to a codec method or settings and also changes according to a picture of the transmitted video.

In the receiving device 40 of this embodiment, the maximum value of the codec delay amount is measured in advance, and the maximum value is set as the codec delay amount.

The time stamp acquisition unit 41 receives the encoded data DENC sent out from the transmitting device 30 and transmitted through the transmission line 50, and acquires the added time stamp information indicating the sent-out time, and further outputs it to the delay time calculation unit 44. In addition, the time stamp acquisition unit 41 outputs the encoded data DENC to the decoder 42.

The decoder 42 decodes the received encoded data DENC, and outputs the decoded video data DDEC to the buffer 43.

The buffer 43 as a synchronization signal output unit synchronizes the video data DDEC decoded by the decoder 42 with the input reference synchronization signal RSYNC, and outputs it.

In this embodiment, the amount of the buffer 43 can be suppressed to the minimum.

The delay time calculation unit 44 functions as a transmission delay measuring unit of the receiving device 40.

The delay time calculation unit 44, with reference to the time information in the time information storage unit 47, measures the delay time of the transmission line 50 on the basis of the time information added to the encoded data DENC and the time information of when the encoded data was received.

The delay time calculation unit 44 determines the delay time necessary for transmission by taking in the delay time of each packet passing through the transmission line 50 and performing statistical processing thereon. This value will be referred to as an "allowable transmission delay time."

As described above, the delay time calculation unit 44 measures the delay time of the transmission line using the actual encoded data. The delay time calculation unit 44 performs the measurement for a given period of time to grasp jitter of a transmission delay, and, once a delay time of each packet is collected, performs statistical processing on the set of delay times to calculate the delay time of the transmission line 50.

The synchronization signal time conversion unit 45, with reference to the time information in the time information storage unit 47, converts the input reference synchronization signal RSNYC into time information, and outputs it to the CPU 46.

The CPU 46 functions as a synchronization signal transmission unit in conjunction with the synchronization signal time conversion unit 45.

The CPU 46 functioning as the synchronization signal transmission unit determines, as the time necessary for transmission, the summed time of the allowable transmission delay time obtained by the delay time calculation unit 44 and the preset codec delay amount.

The CPU 46 uses the thus determined time necessary for transmission as a phase difference of the synchronization signal, and generates as the phase information time information for creating a synchronization signal that is advanced relative to the reference synchronization signal RSYNC, which has been converted into time by the synchronization signal time conversion unit 45, by the time of the phase difference necessary for transmission.

Then, the CPU 46 transmits the generated phase information PHS to the transmitting device 30 through the transmission line 50.

In response, the synchronization signal generation unit 33 of the transmitting device 30 creates a synchronization signal SYNC by creating pulses of time information on the basis of the time information, and sets the phase of the generated synchronization signal SYNC to be advanced.

Note that the synchronization signal transmission unit including the synchronization signal time conversion unit 45 and the CPU 46 records the time of the input reference synchronization signal RSYNC for each synchronization pulse, for example, for each vertical synchronization signal of a video signal, and transmits it as the phase information to the transmitting device 30 through the transmission line 50.

In this embodiment, the time information storage unit 47 of the receiving device 40 holds time information independently of the transmitting device 30. This time is information indicating the date and time unified in the world. It is possible to set the time to the right time using a technique such as a NTP, GPS, or RTC. Accordingly, the time information 34 of the transmitting device 30 and the time of the time information 47 are adjusted such that they become close to each other.

Although the summed time of the allowable transmission delay time obtained by the delay time calculation unit 44 and the preset codec delay amount is determined as the time necessary for transmission in this embodiment, it is also possible to use the allowable transmission delay time as the time necessary for transmission.

<4. Exemplary Operation at Booting>

Figure 4:
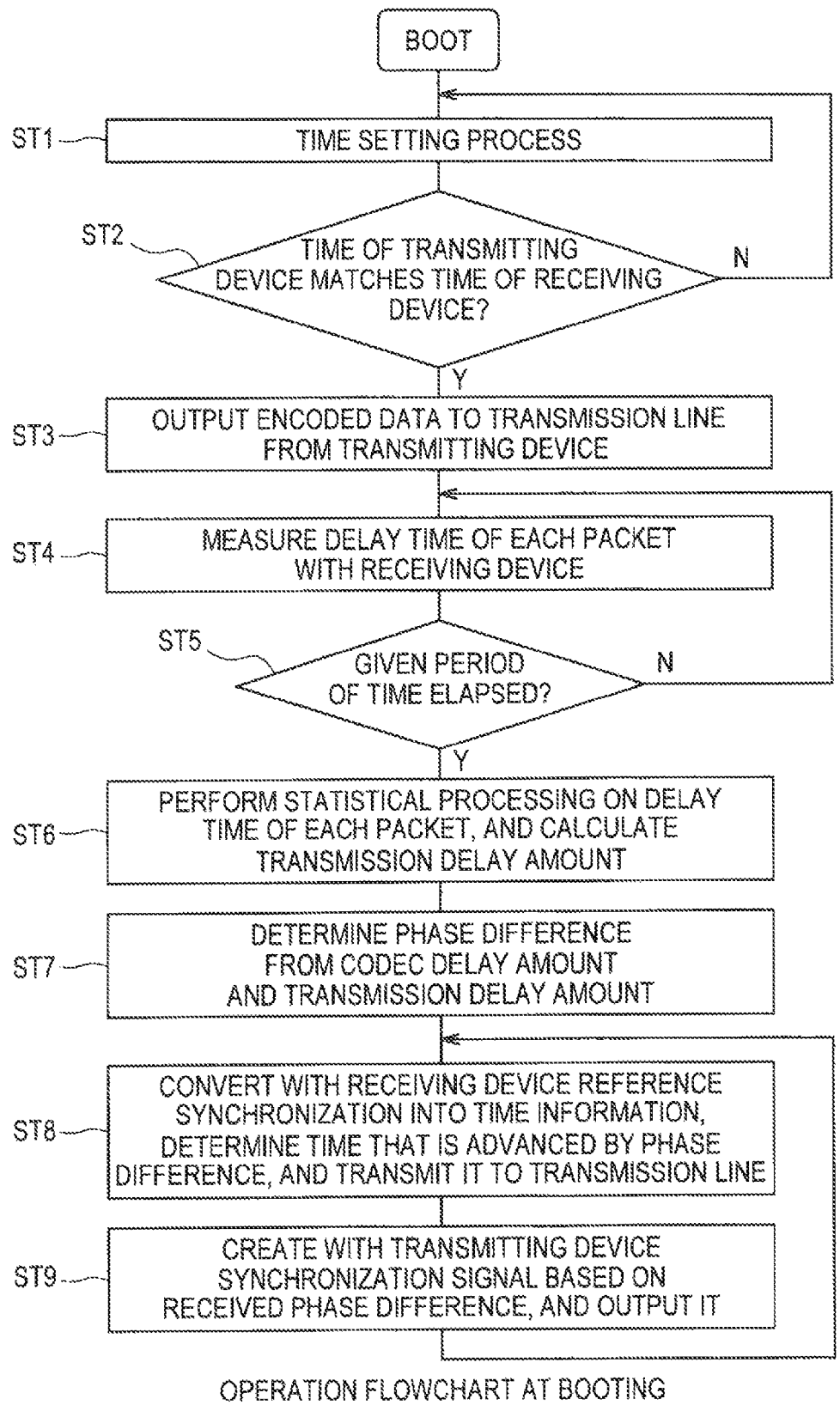
FIG. 4 is a flowchart for illustrating the operation when the video transmission device of the embodiment is booted.

FIG. 4 is a flowchart showing the operation of the video transmission device of this embodiment at booting.

[Step ST1]

First, in step ST1, time information of the transmitting device 30 and that of the receiving device 40 are set by the time information storage units 34 and 47.

[Step ST2]

Next, in step ST2, if the time of the transmitting device 30 matches that of the receiving device 40 is checked.

[Step ST3]

If it is determined that the time of the transmitting device 30 matches that of the receiving device 40 in step ST2, the next process is performed in step ST3. The encoder 31 of the transmitting device 30 converts the input video signal VDS into encoded data, and outputs the encoded data to the time stamp adding unit 32.

The time stamp adding unit 32, with reference to the time information in the time information storage unit 34, adds to the encoded data the time information to be sent out to the transmission line 50 as a time stamp, and sends the encoded data DENC with the added time stamp out to the transmission line 50.

The encoded data DENC transmitted through the transmission line 50 is received by the receiving device 40.

[Step ST4]

In step ST4, the time stamp acquisition unit 41 receives the encoded data DENC transmitted through the transmission line 50, and acquires the added time stamp information indicating the sent-out time, and further outputs it to the delay time calculation unit 44 and the decoder 42.

Then, the delay time calculation unit 44, with reference to the time information in the time information storage unit 47, measures the delay time of the transmission line 50 on the basis of the time information added to the encoded data DENC and the time information of when the encoded data was received.

As described above, the delay time calculation unit 44 measures the delay time of the transmission line using the actual encoded data.

[Step ST5]

In step ST5, the delay time calculation unit 44 performs the measurement for a given period of time to grasp jitter of a transmission delay.

After a given period of time has elapsed, the process proceeds to the process of the next step ST6.

[Step ST6]

In step ST6, the delay time calculation unit 44, after a delay time of each packet is collected, performs statistical processing on the set of delay times to calculate the allowable transmission delay time as the delay time of the transmission line 50.

The allowable transmission delay time is supplied to the CPU 46.

[Step ST7]

In step ST7, the CPU 46 determines as the time necessary for transmission the summed time of the allowable transmission delay time obtained by the delay time calculation unit 44 and the preset codec delay amount.

The CPU 46 uses the thus determined time necessary for transmission as a phase difference of the synchronization signal, and then the process proceeds to the process of the next step ST8.

[Step ST8]

In step ST8, the synchronization signal time conversion unit 45, with reference to the time information in the time information storage unit 47, converts the input reference synchronization signal RSYNC into time information, and outputs it to the CPU 46.

The CPU 46 generates as the phase information time information for creating a synchronization signal that is advanced relative to the reference synchronization signal RSYNC, which has been converted into time by the synchronization signal time conversion unit 45, by the time of the phase difference necessary for transmission.

Then, the CPU 46 transmits the generated phase information PHS to the transmitting device 30 through the transmission line 50.

In response, the synchronization signal generation unit 33 of the transmitting device 30 creates a synchronization signal SYNC by creating pulses of time information on the basis of the time information, and sets the phase of the generated synchronization signal SYNC to be advanced.

Note that the synchronization signal transmission unit including the synchronization signal time conversion unit 45 and the CPU 46 records the time of the input reference synchronization signal RSYNC for each synchronization pulse, for example, for each vertical synchronization signal of a video signal, and transmits it as the phase information to the transmitting device 30 through the transmission line 50.

[Step ST9]

In step ST9, the synchronization signal generation unit 33, on the basis of the phase information PHS transmitted through the transmission line 50, generates a synchronization signal SNYC so that an input video signal VDS will be advanced by the time necessary for transmission.

The synchronization signal generation unit 33 generates the synchronization signal SYNC by creating pulses of time information on the basis of the time information included in the phase information PHS, and sets the phase of the generated synchronization signal SNYC to be advanced.

Upon receiving the synchronization signal SNYC output from the synchronization signal generation unit 33, the imaging unit 20 adjusts the imaging timing. Accordingly, the imaging unit 30 inputs to the encoder 31 a video signal VDS synchronized with a phase that is advanced relative to the reference synchronization signal RSYNC input to the receiving device 40 by the time of the phase difference necessary for transmission.

The encoder 31 of the transmitting device 30 converts the input video signal VDS into encoded data in a similar way to that described above, and outputs the encoded data to the time stamp adding unit 32.

The time stamp adding unit 32, with reference to the time information in the time information storage unit 34, adds to the encoded data the time information to be sent out to the transmission line 50 as a time stamp, and transmits the encoded data with the added time stamp to the transmission line 50.

The encoded data DENC transmitted through the transmission line 50 is received by the receiving device 40.

In the receiving device 40, the time stamp acquisition unit 41 receives the encoded data DENC transmitted through the transmission line 50, and acquires the added time stamp information indicating the sent-out time, and further outputs it to the delay time calculation unit 44 and the decoder 42.

The decoder 42 decodes the received encoded data DENC, and outputs the decoded video data DDEC to the buffer 43.

The buffer 43 as a synchronization signal output unit synchronizes the video data DDEC decoded by the decoder 42 with the input reference synchronization signal RSYNC, and outputs it.

As described above, according to this embodiment, the synchronization signal SYNC is output from the transmitting device 30 and the phase of the synchronization signal SYNC is controlled, whereby the phase of the video signal VDS obtained by the imaging unit 20 and input to the transmitting device 30 is controlled.

The timing of the synchronization signal SYNC output from the transmitting device 30 is advanced relative to the reference synchronization signal RSYNC input to the receiving device 40 by the delay amount necessary for transmission, whereby the input video is advanced by the delay time necessary for transmission.

Thus, according to this embodiment, it is possible to obtain decoded video that is synchronized with the reference synchronization signal RSYNC input to the receiving device 40.

Further, low-delay video transmission is realized by combining with a function of measuring the amount of delays generated in the transmission line 50 and calculating the minimum delay amount.

That is, according to this embodiment, low-delay video transmission can be realized that can accommodate jitter of a transmission delay of an asynchronous transmission line and can obtain video output that is synchronized with a synchronization signal input.

Second Embodiment

1. Overall Configuration of Camera System

Figure 5:
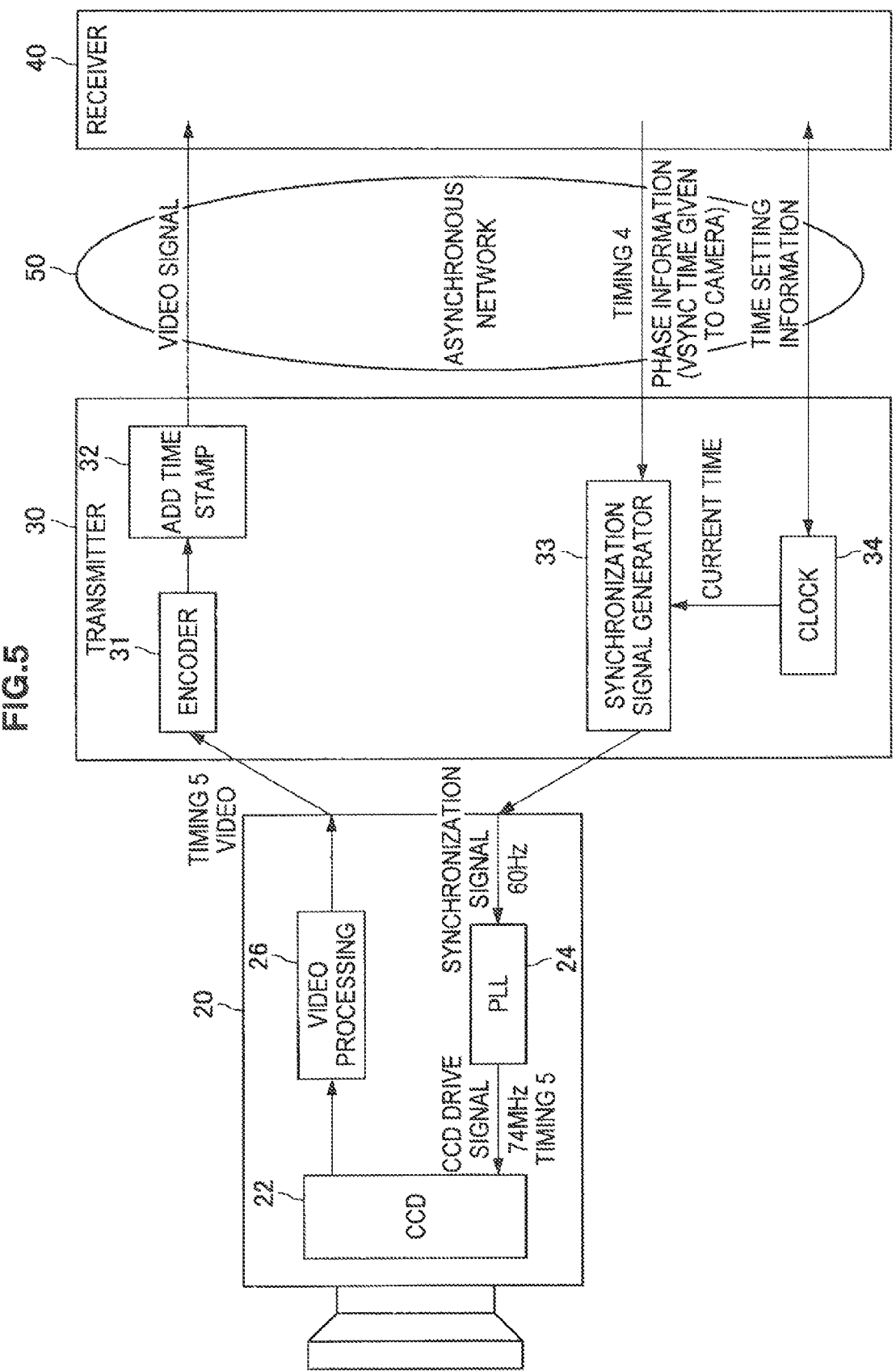
FIG. 5 is a schematic diagram showing a system configuration of the second embodiment.
Figure 6:
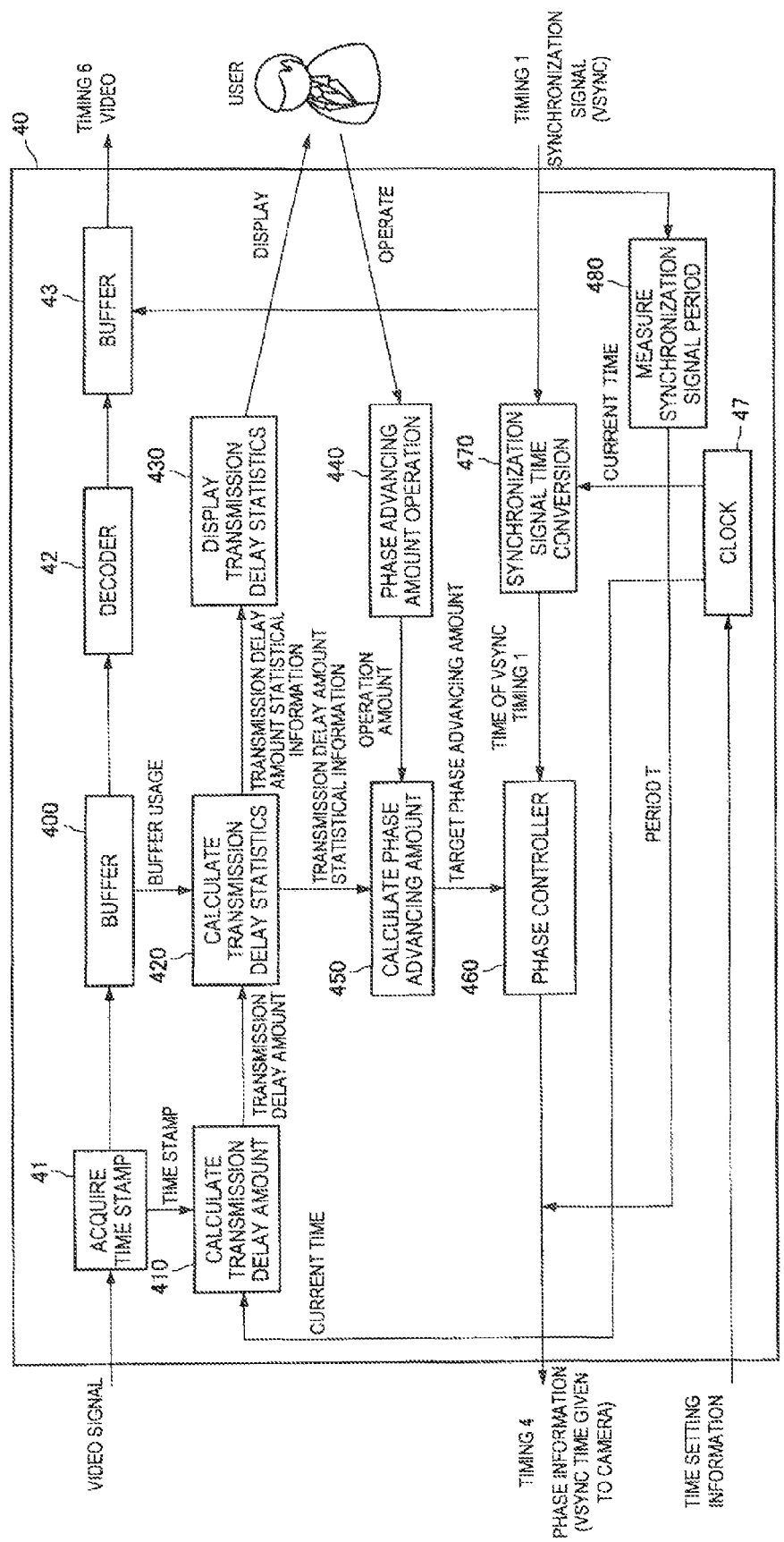
FIG. 6 is a schematic diagram showing a system configuration of the second embodiment.

Next, the second embodiment of the present invention will be described. FIGS. 5 and 6 are schematic diagrams each showing the system configuration of the second embodiment. As shown in FIGS. 5 and 6, the system in accordance with the second embodiment includes the imaging unit (camera) 20, the transmitting device 30, the receiving device 40, and the transmission line 50. The basic configurations of the imaging unit (camera) 20, the receiving device 40, and the transmission line 50 are similar to those in the first embodiment.

As shown in FIG. 5, the transmitter and the receiver are connected via an asynchronous network. FIG. 5 shows the configurations of the camera and the transmitter, and FIG. 6 shows the configuration of the receiver.

As shown in FIG. 5, the imaging unit (camera) 20 includes a CCD (image pickup device) 22, a PLL 24, and a video processing unit 26. As in Embodiment 1, the transmitting device 30 includes an encoder 31, a time stamp adding unit 32, a synchronization signal generation unit 33, and a time information storage unit 34.

The receiving device 40 includes a time stamp acquisition unit 41, a buffer 400, a decoder 42, a buffer 43, a transmission delay amount calculation unit 410, a transmission delay amount statistics calculation unit 420, a transmission delay amount statistics display unit 430, a phase advancing amount operation unit 440, a phase advancing amount calculation unit 450, a phase controller 460, a synchronization signal time conversion unit 470, a synchronization signal period measuring unit 480, and a time information storage unit 47. The transmission delay amount calculation unit 410 and the synchronization signal time conversion unit 470 correspond to the delay time calculation unit 44 and the synchronization signal time conversion unit 45, respectively, in the first embodiment. The buffer 400 is a transmission delay jitter absorbing buffer for, when transmission is performed through an asynchronous transmission network, absorbing variations in the transmission delay time. Note that in the second embodiment, the time stamp acquisition unit 41 and the transmission delay amount calculation unit 410 constitute the transmission delay information acquisition unit. In addition, the synchronization signal time conversion unit 470 and the phase controller 460 constitute the synchronization signal transmission unit.

In the second embodiment, a user is able to operate the phase advancing amount on the basis of the transmission delay amount. Herein, the transmission delay amount is the transmission delay time of an asynchronous network as described above. For this reason, when the transmission delay amount is displayed on the transmission delay amount statistics display unit 430, a user who has viewed the transmission delay amount is able to adjust the phase advancing amount to a desired value by inputting the phase advancing amount operation unit 440.

In order to realize the desired adjustment by the user, the phase delay amount statistics calculation unit 430 calculates a variety of statistical information such as distribution of the transmission delay amount, transition of the transmission delay amount, distribution of the buffer usage rate, and transition of the buffer usage rate. The calculation result obtained by the phase delay amount statistics calculation unit 430 is displayed on the transmission delay amount statistics display unit 430.

Hereinafter, a specific description will be given on the basis of the drawings. The transmission delay amount calculation unit 410, with reference to the time information in the time information storage unit 47, measures the delay time of the transmission line 50 on the basis of the time information (time stamp) added to the encoded data DENC and the time information of when the encoded data was received. The transmission delay statistics calculation unit 420 takes in the delay time, and performs statistical processing thereon. The result of the statistical processing is displayed on the transmission delay amount statistics display unit 430: In addition, the result of the statistical processing is also transmitted to the phase advancing amount calculation unit 450.

2. Example of Statistical Information

Figure 7:
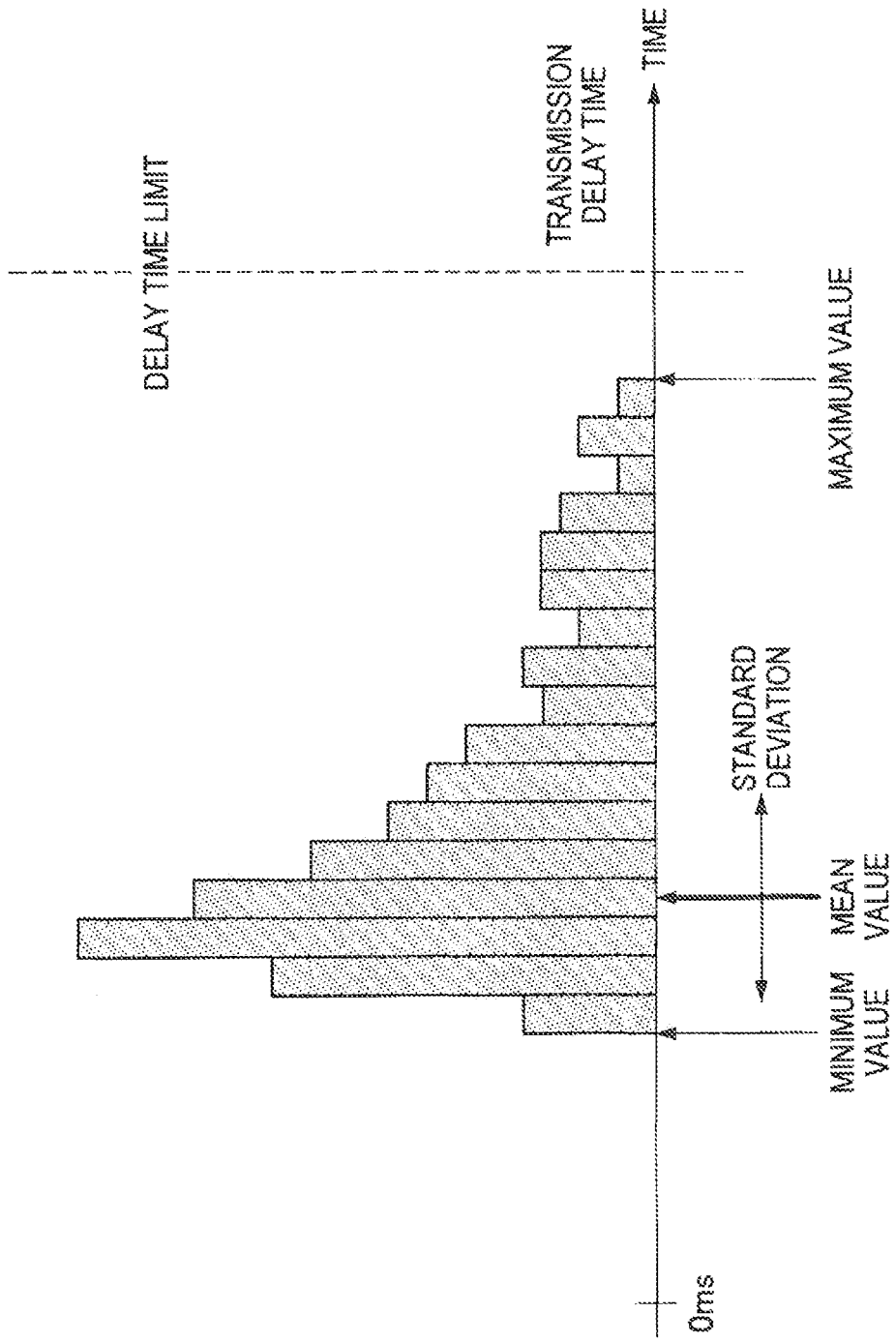
FIG. 7 is a schematic diagram showing an exemplary result of statistical processing.
Figure 8:
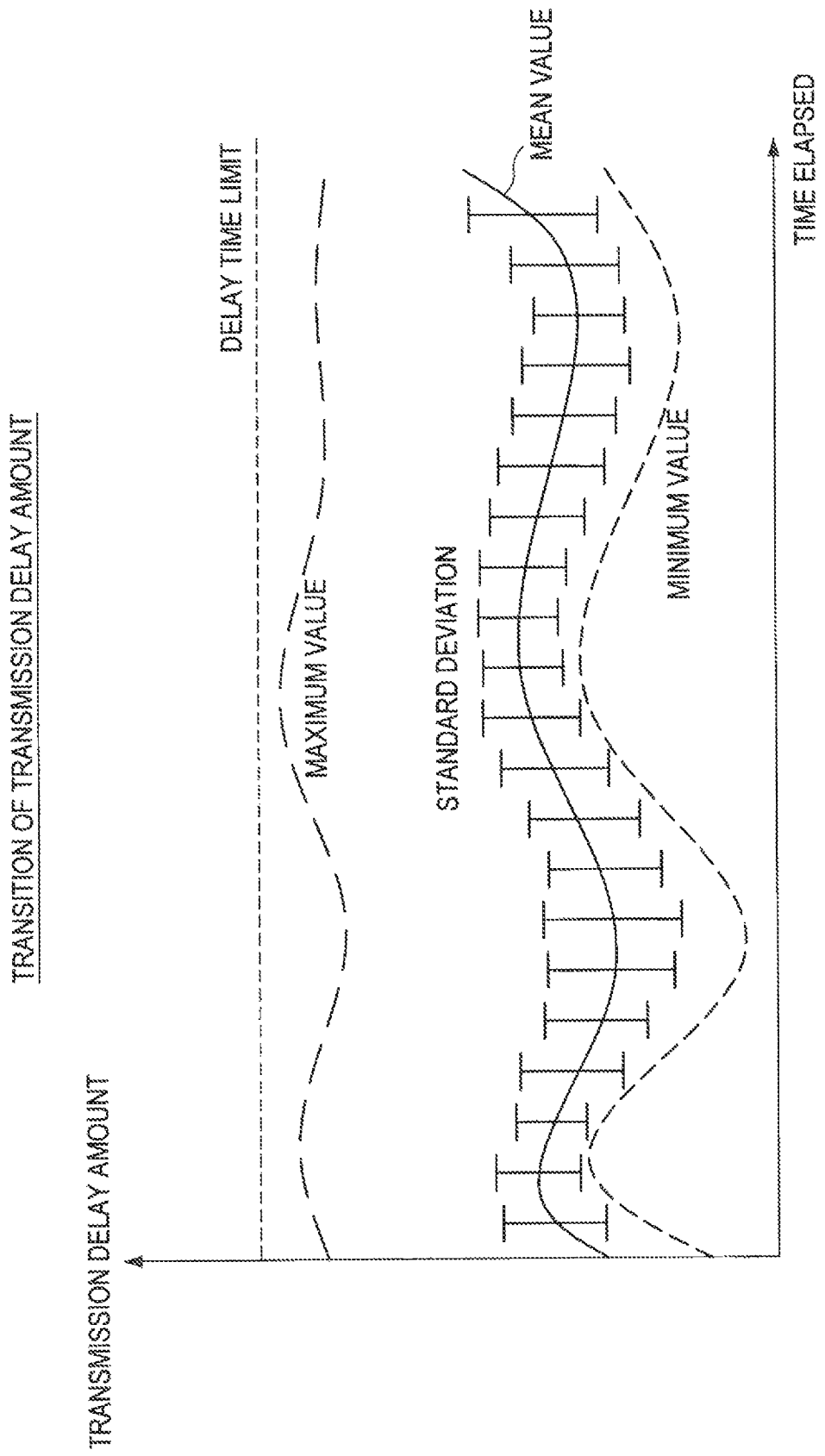
FIG. 8 is a schematic diagram showing an exemplary result of statistical processing.

FIGS. 7 to 10 are schematic diagrams each showing an exemplary result of the statistical processing. Herein, FIG. 7 shows the mean value, standard deviation, maximum value, minimum value, and histogram of the transmission delay amount at given time. In the example shown in FIG. 7, distribution of the transmission delay amount as well as various values such as the mean value, minimum value, maximum value, standard deviation, and delay time limit are shown. Meanwhile, FIG. 8 is a schematic diagram showing transition of the transmission delay amount. In the example shown in FIG. 8, temporal transition of the mean value, standard deviation, maximum value, and minimum value of the transmission delay amount are shown.

Figure 9:
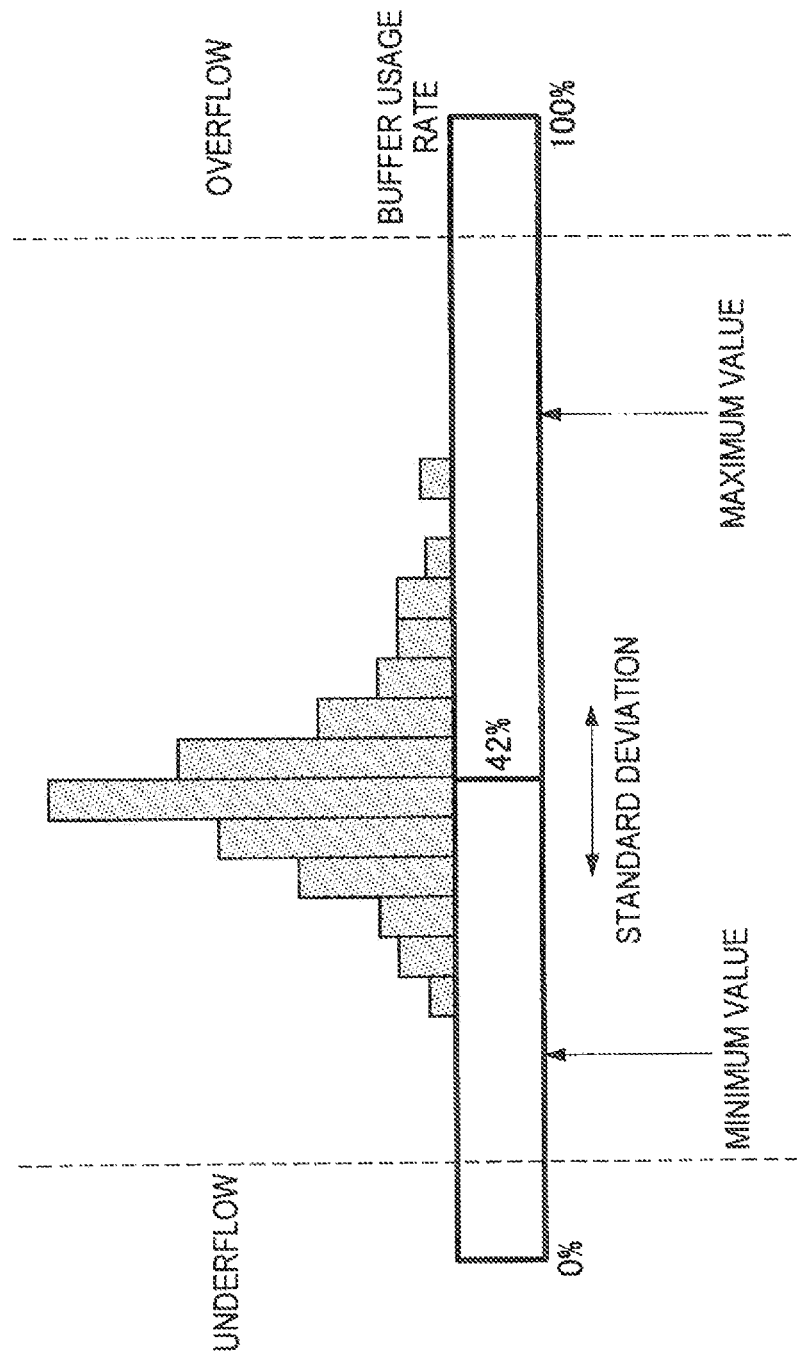
FIG. 9 is a schematic diagram showing an exemplary result of statistical processing.
Figure 10:
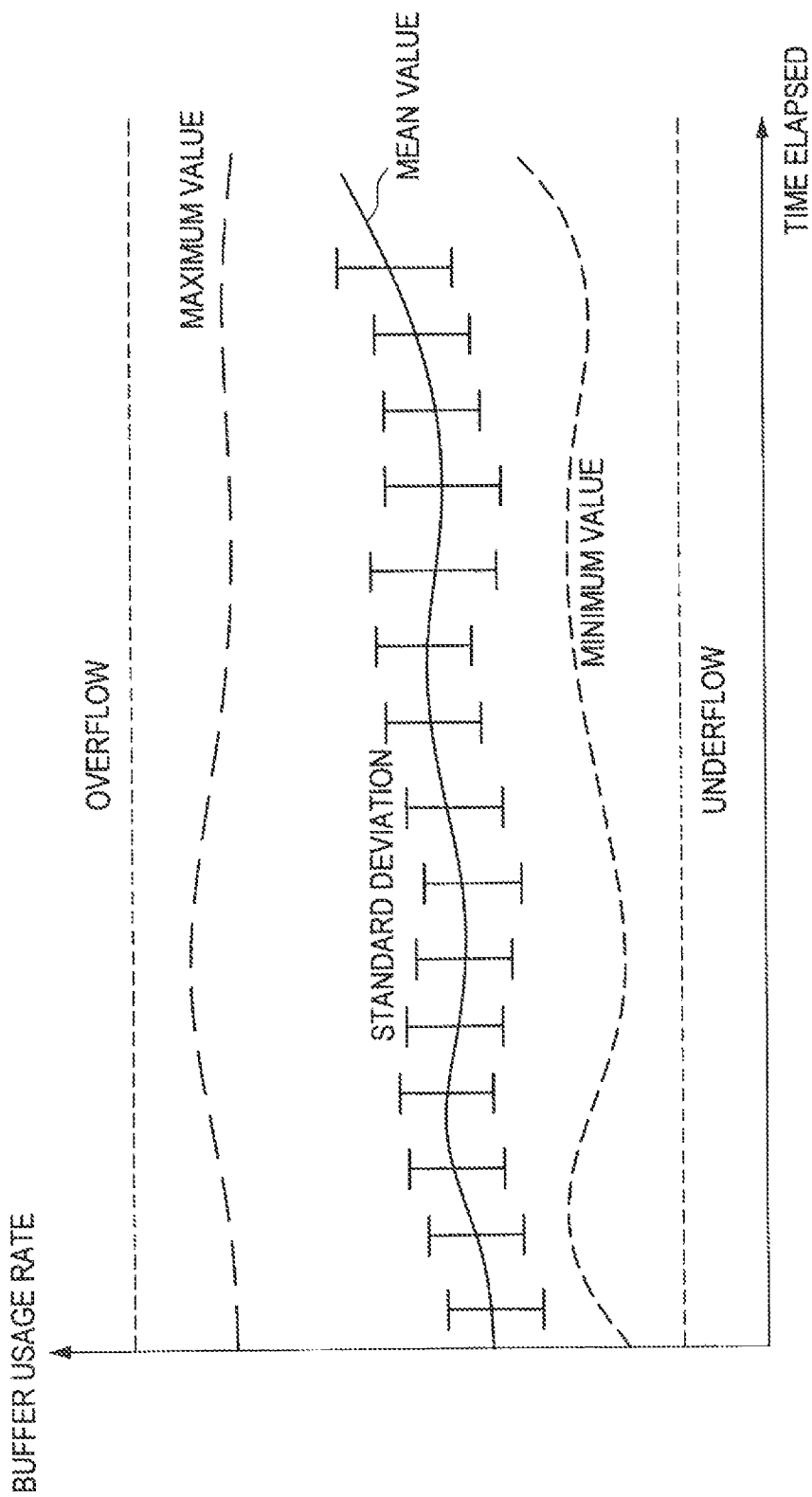
FIG. 10 is a schematic diagram showing an exemplary result of statistical processing.

FIG. 9 shows the mean value, standard deviation, maximum value, minimum value, and histogram of the usage rate of the transmission delay jitter absorbing buffer at given time. In the example shown in FIG. 9, the usage rate of the buffer 400 is shown by a histogram, and values such as the mean value (=42%), minimum value, maximum value, and standard deviation of the buffer usage rate are shown. Meanwhile, FIG. 10 is a schematic diagram showing transition of the buffer usage rate shown in FIG. 9. In the example shown in FIG. 10, temporal transition of the mean value, standard deviation, maximum value, and minimum value of the transmission delay jitter absorbing buffer usage rate are shown.

When results of the statistical processing such as those shown in FIGS. 7 to 10 are displayed on the delay amount statistics display unit 430, the user is able to, in the manual mode, operate the phase advancing amount on the basis of the display content. In this case, the user inputs an operation to the phase advancing amount operation unit 440. The input operation amount is sent to the phase advancing amount calculation unit 450. The phase advancing amount calculation unit 450 calculates an optimum phase advancing amount from the input operation amount and a phase advancing amount adjustment parameter that has been operationally input, and sends the target phase advancing amount to the phase controller 460.

The synchronization signal time conversion unit 470 receives a synchronization signal VSYNC. The synchronization signal time conversion unit 470, with reference to the time information in the time information storage unit 47, converts the input reference synchronization signal VSYNC into time information, and inputs it to the phase controller 460. The phase controller 460 generates as the phase information time information for creating a synchronization signal that is advanced relative to the reference synchronization signal VSYNC, which has been converted into time by the synchronization signal time conversion unit 470, by the time of the phase difference necessary for transmission.

In addition, the synchronization signal period measuring unit 480 measures the period T of the reference synchronization signal VSYNC. The period T is added to the output of the phase controller 460. Accordingly, the time of VSYNC to be given to the camera is retarded by one period T. Accordingly, it is possible to control the phase of a signal at the next time without controlling a signal at the past time. Then, VSYNC to be given to the camera is transmitted to the transmitter 30 via an asynchronous network.

The basic process performed by the transmitting device 30 is similar to that in the first embodiment. The synchronization signal generation unit 33 of the transmitting device 30 creates a synchronization signal SYNC (60 Hz) by creating pulses of time information on the basis of the time information, and sets the phase of the generated synchronization signal. SYNC to be advanced. The PLL 24, on the basis of the synchronization signal SYNC transmitted from the synchronization signal generation unit 33, outputs a drive signal of the image pickup device (CCD) 22. A video signal VDS obtained by the image pickup device 22 through imaging is subjected to predetermined video processing (e.g., white balance processing or edge emphasis processing) at the video processing unit 26, and is then output to the transmitting device 30.

3. Adjustment of Phase Advancing Amount Based on Statistical Information

In the manual mode, a user is able to operate the adjustment parameter of the phase advancing amount on the basis of the displayed transmission delay statistics information. For example, the user is able to, with reference to the results of the statistical processing in FIGS. 7 and 8, input an operation amount for reducing the phase advancing amount to the phase advancing amount operation unit 440 if the distribution of the transmission delay amount has become close to zero. Accordingly, the allowable transmission delay time becomes shorter, and thus the total delay time becomes shorter, whereby a low delay is achieved. Meanwhile, the user is able to, if the distribution of the transmission delay amount has become close to the delay time limit, input an operation amount for increasing the phase advancing amount to the phase advancing amount operation unit 440. Accordingly, the allowable transmission delay time becomes longer, and thus it becomes possible to accommodate a large transmission delay, so that video distortion caused by a buffer underflow becomes unlikely to occur.

Further, the user is able to, with reference to the results of the statistical processing in FIGS. 9 and 10, perform an operation so as to reduce the phase advancing amount if the distribution of the buffer usage rate is large. Accordingly, the allowable transmission delay time becomes shorter and the time for waiting in the buffer becomes shorter. Thus, it is possible to achieve a low delay while at the same time reducing the buffer usage rate. Meanwhile, the user is able to, if the distribution of the buffer usage rate is small, perform an operation so as to increase the phase advancing amount. Accordingly, the allowable transmission delay time becomes longer and the time for waiting in the buffer becomes longer. Thus, the buffer usage rate can be increased. Preferably, adjustment is performed such the buffer usage rate is reduced as much as possible within the range that the buffer 400 is not in underflow.

As the adjustment parameter of the phase advancing amount, it is possible to use, in addition to the value of the phase advancing amount, a total delay time, delay packet discard rate, phase advancing amount offset, maximum delay amount margin, average buffer usage rate, maximum/minimum buffer usage rate, and the like.

In the automatic mode, the phase advancing amount calculation unit 450 can calculate the phase advancing amount on the basis of the calculation result obtained by the transmission delay amount statistics calculation unit 420. In this case, the phase advancing amount calculation amount 450 calculates the phase advancing amount on the basis of the transmission delay amount statistical information sent from the transmission delay statistics calculation unit 420.

As a specific example of a method for calculating the phase advancing amount in the automatic mode, probability distribution p(t) of the transmission delay time is estimated from the statistical information, and from this distribution, the minimum transmission delay time t_delay in which a packet loss is less than or equal to a given target value P_loss is determined. Then, a time obtained by adding the time t_misc, which is necessary for processes other than transmission, such as a video encoding/decoding time and a packetizing time, to the transmission delay time t_delay (t_delay+t_misc) is set as the phase advancing amount.

As described above, the allowable transmission delay time can be optimally controlled on the basis of the distribution of the transmission delay amount or the buffer usage rate. Thus, it is possible to surely prevent the transmission delay amount from exceeding the delay time limit. Further, it is also possible to surely prevent an overflow or underflow of the buffer usage rate.

In particular, for a broadcast appliance requiring high quality, it is very important that an operator be able to check if the video quality can be ensured. For example, for a VTR, there is a monitoring function that indicates if reproduction of a tape is being conducted normally, and such a function is mounted on a product. In addition, a camera is mounted with an optical level monitoring function for knowing the stability of optical cable transmission between a system camera and a camera control unit. When an asynchronous network is used, the transmission quality is also influenced by the communication status of other appliances sharing the network. Thus, mounting a monitoring function such as the one described in this embodiment will allow optimum adjustment to be performed. Accordingly, if the status of the transmission line (e.g., transmission delays or variations thereof) has changed during operation, it is possible to surely suppress video distortion by adjusting the allowable transmission delay time and the buffer usage rate according to circumstances.

Figure 11:
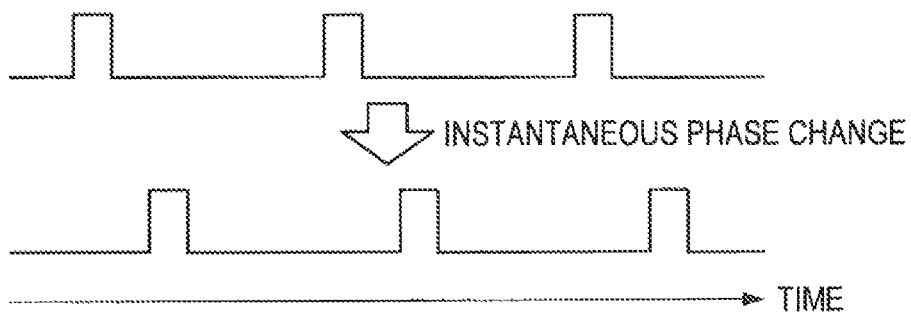
FIG. 11 is a schematic diagram showing a case in which the phase advancing amount is changed instantaneously.
Figure 12:
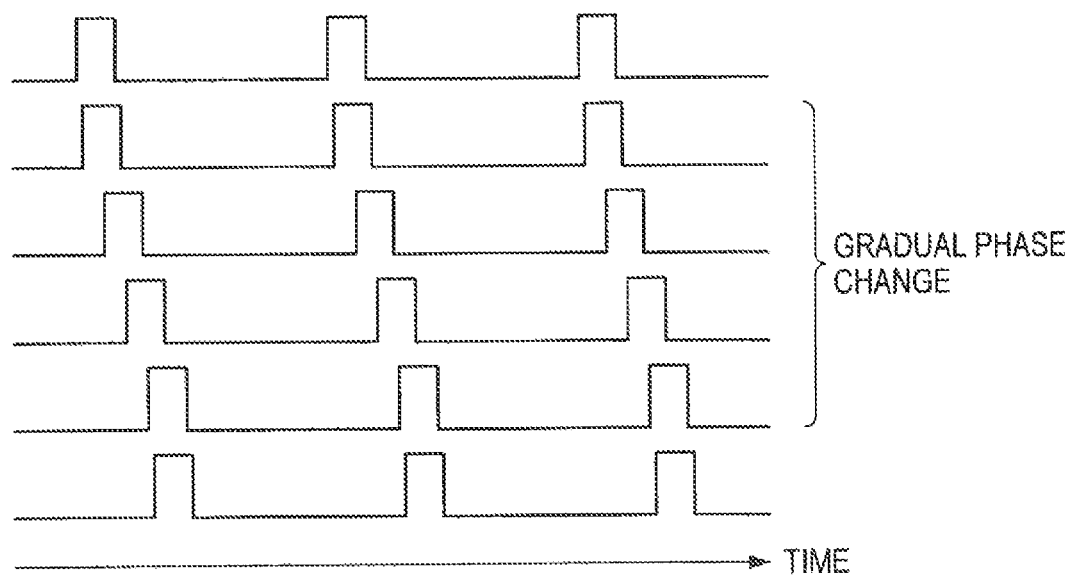
FIG. 12 is a schematic diagram showing a case in which the phase advancing amount is changed gradually.

FIGS. 11 and 12 are schematic diagrams each showing an exemplary method for controlling the phase. Herein, FIG. 11 shows a case in which the phase advancing amount is changed instantaneously. In this case, as shown in FIG. 11, the phase advancing amount is changed instantaneously from the phase shown in the upper diagram to the phase shown in the lower diagram. With this method, it is possible to promptly adjust the phase, but it is presumed that synchronization with a synchronization signal on the camera side will not be maintained, and thus the video will be distorted. With the method of FIG. 11, the phase can be promptly changed, but there is a possibility that video may be distorted. Thus, this method is preferably used mainly for inserting or removing a synchronization signal, changing the video format, an initialization process at booting, preparation before imaging, and the like.

Meanwhile, FIG. 12 shows a case in which the phase advancing amount is changed gradually. In this case, as shown in FIG. 12, the phase advancing amount is changed gradually from the phase shown in the upper diagram to the phase shown in the lower diagram. In this case, in order to attain a given phase advancing amount, the phase advancing amount is changed little by little within the range that synchronization with the camera is maintained. In this method, the phase is moved by changing the operating frequency of the camera 20. Thus, as the drive frequency of the CCD 22 gradually changes as described with reference to FIG. 10, synchronization with the camera will be maintained and thus the video will not be distorted. Meanwhile, a change in the phase advancing amount is slower in comparison with the method of FIG. 11. With the method of FIG. 12, it is possible to suppress video distortion to the minimum. Thus, this method is preferably used mainly for adjusting the phase during imaging.

A specific example of the process of gradually changing the phase advancing amount in the case of FIG. 12 is shown below.

if($t\_goal-t\_now > \Delta t\_max$) then $t\_next = t\_now + \Delta t\_max$ else if($t\_goal-t\_now < -\Delta t\_max$) then $t\_next = t\_now - \Delta t\_max$ else $t\_next = t\_goal$, where, in the above formula,
t_goal: the target value of the phase advancing amount
t_now: the current phase advancing amount
t_next: the next phase advancing amount
$\Delta t\_max$: the maximum value of the amount of a small change in the phase advancing amount According to the above formula, the following process is realized.

When the difference of the current phase advancing amount from the target value of the phase advancing amount is greater than or equal to the maximum value of the amount of a small change, the next phase advancing amount is set to the sum of the current phase advancing amount and the maximum value of the amount of a small change.

When the difference of the target value of the phase advancing amount from the current phase advancing is greater than or equal to the maximum value of the amount of a small change, the next phase advancing amount is set to the difference between the current phase advancing amount and the maximum value of the amount of a small change.

In other cases, the target value of the phase advancing amount is used as the next phase advancing amount.

Figure 13:
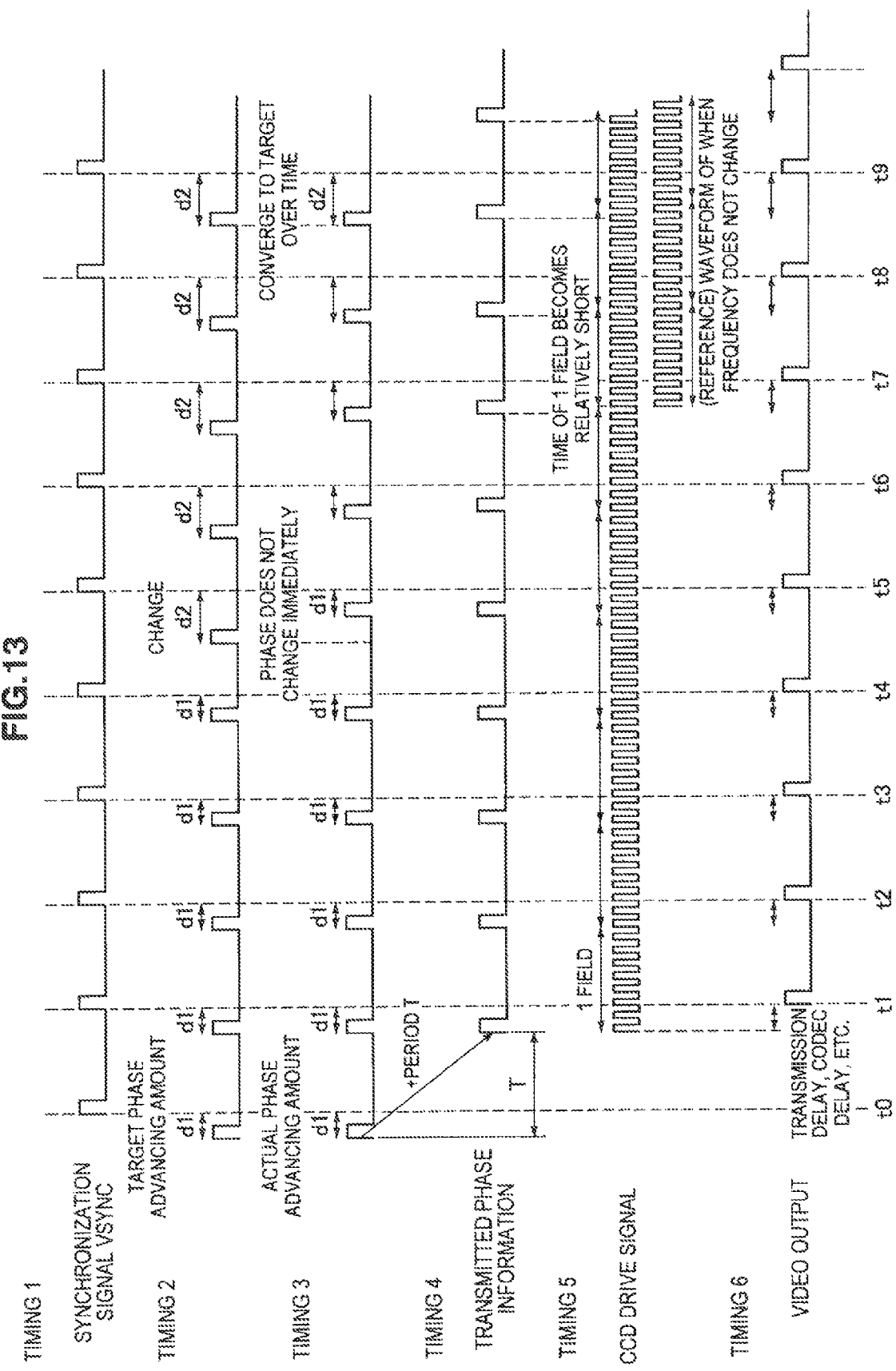
FIG. 13 is a timing chart showing a signal at each timing of a receiving device 40 in FIG. 6.

FIG. 13 is a timing chart showing a signal at each timing of the receiving device 40 in FIG. 6. Timing 1 indicates a state in which a synchronization signal SYNC is converted into time by the synchronization signal time conversion unit 470. Timing 2 indicates a signal (a target value) of when the phase is advanced by the target phase advancing amount, output from the phase advancing amount calculation unit 450.

Timing 3 indicates a signal output from the phase controller 460, and indicates the actual phase advancing amount when the phase is advanced by the target phase advancing amount by the phase controller 460. When a target phase advancing amount d1 is given from the phase advancing amount calculation unit 450 at time t0, the actual phase advancing amount output from the phase controller 460 will be advanced by d1. This case corresponds to the case in which the phase is switched instantaneously, described with reference to FIG. 11.

When the target phase advancing amount changes to d2 at time t5, the actual phase advancing amount will not change immediately, but will gradually converge to the target over time from the time t5 to t9. Then, the actual phase advancing amount reaches d2 at time 9. This case corresponds to the case in which the phase is switched gradually, described with reference to FIG. 12.

Timing 4 shown in FIG. 13 indicates a state in which a period measured by the synchronization signal period measuring unit 480 is added to the output from the phase controller 460 (the signal of the timing 3). When the period T is added in this way, the output of the phase controller 460 is retarded by the period T. As shown in FIG. 5, a signal of the timing 4 is sent to the transmitting device 20, and is then sent to the PLL 24 of the camera 10 from the synchronization signal generation unit 33.

Timing 5 indicates a CCD drive signal generated by the PLL 24 from the signal of the timing 4. The intervals of a synchronization signal correspond to the section of one field.

When the actual phase advancing amount changes from time 6, the intervals of the synchronization signal become shorter until the actual phase advancing amount converges to the target. Thus, the section of one field becomes slightly shorter. When the actual phase advancing amount d2 reaches the target value, the intervals of the synchronization signal (the section of one field) return to the original state.

Timing 6 indicates a signal that is output as video from the buffer 33 in response to a video signal sent to the receiving device 30 from the network 50. The signal of the timing 6 contains a transmission delay due to the network 50, a codec delay, and the like.

As described above, when the phase is changed by the target phase advancing amount output from the phase advancing amount calculation unit 450, it becomes possible to optimally control the actual phase advancing amount. Although FIG. 13 shows a case in which the phase is advanced, the process can be similarly performed when the phase is retarded.

4. Process Procedures of System of This Embodiment

Figure 14:
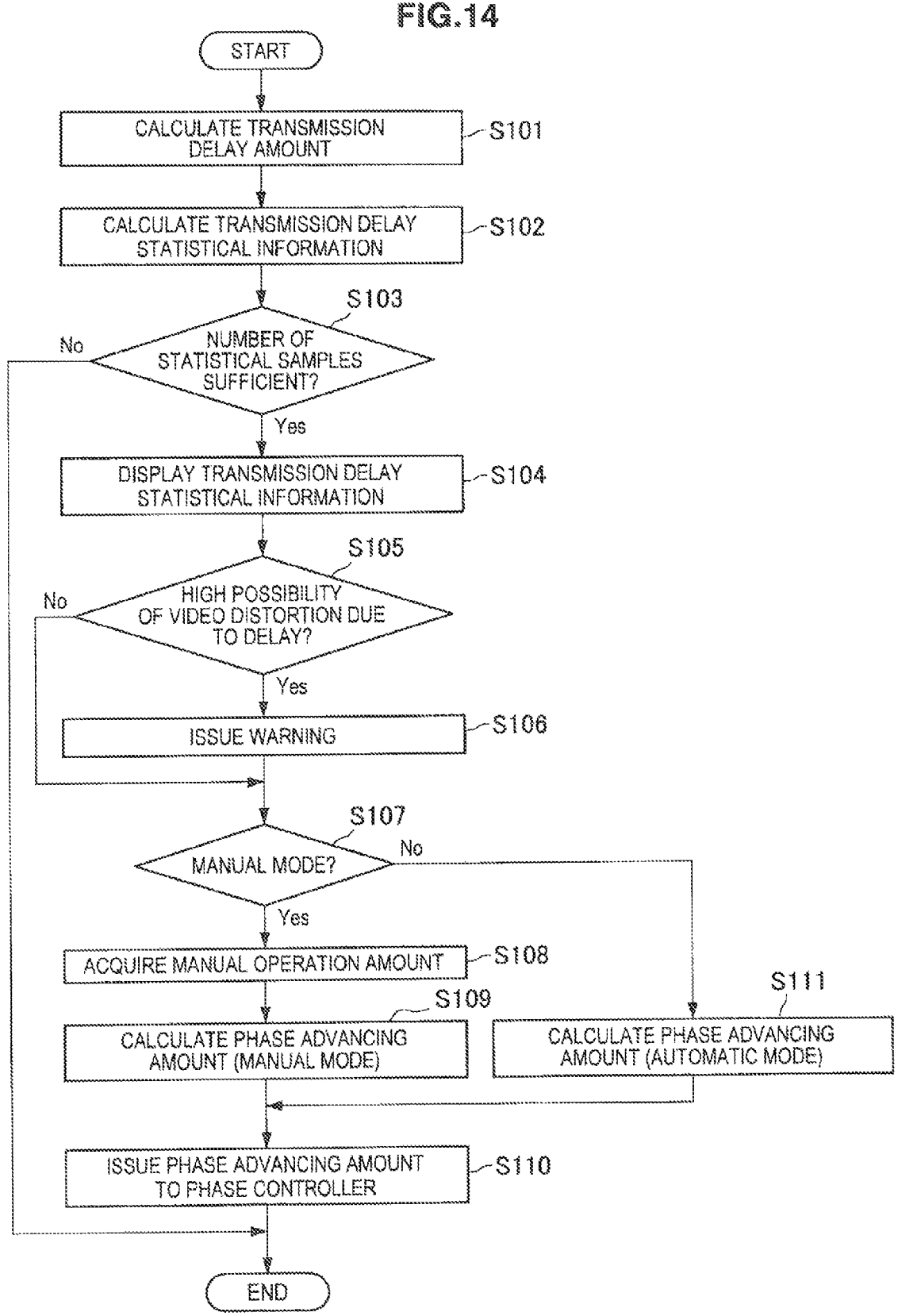
FIG. 14 is a flowchart showing a process of from receiving video information to issuing a phase advancing amount.
Figure 15:
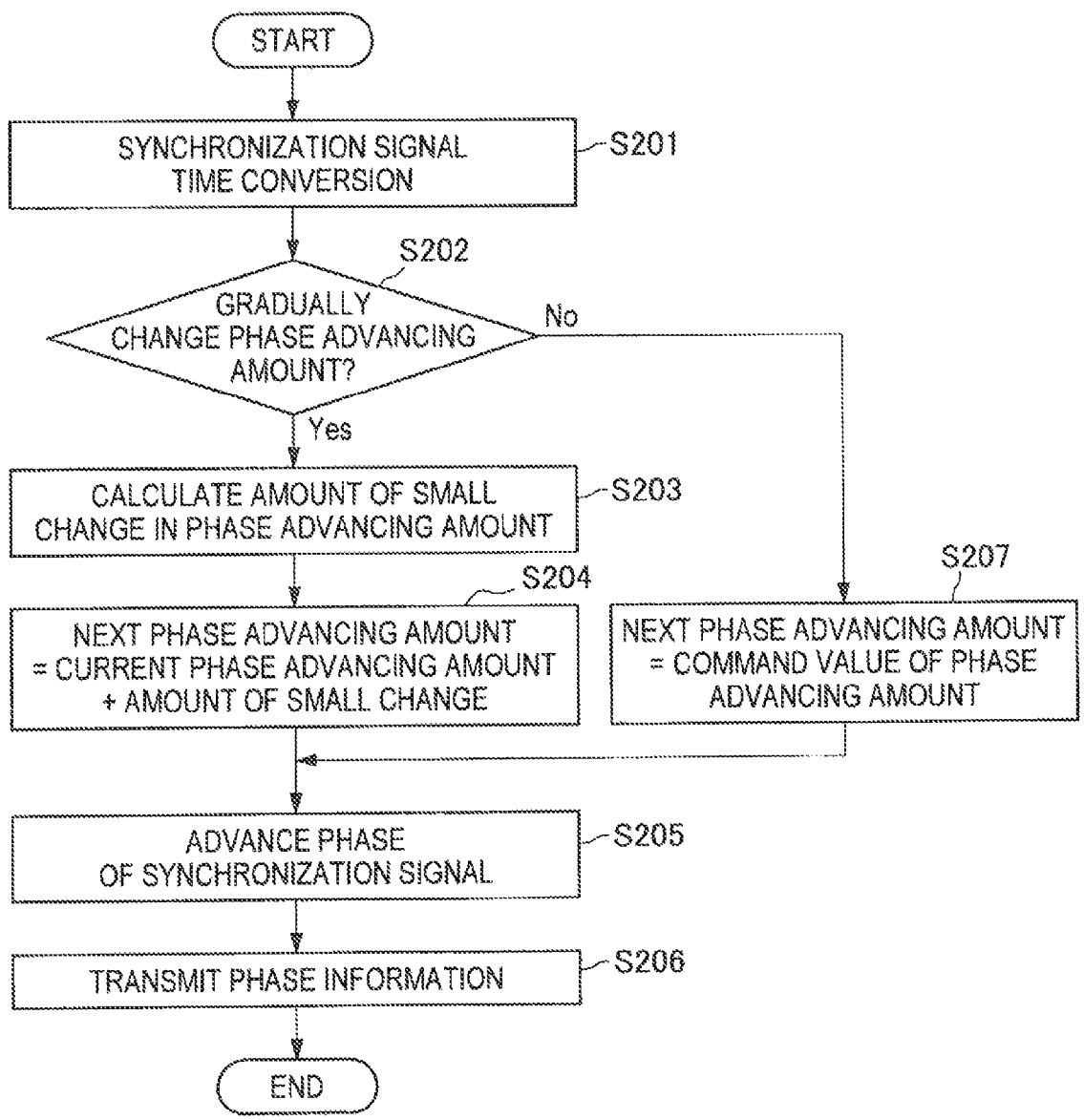
FIG. 15 is a flowchart showing a process of from synchronization signal input to phase information transmission.

Next, the process of this embodiment will be described. FIG. 14 is a flowchart showing a process of from receiving video information to issuing a phase advancing amount. Meanwhile, FIG. 15 is a flowchart showing a process of from synchronization signal input to phase information transmission.

First, in step S101 in FIG. 14, when the receiving device 40 receives a video signal, a time stamp added to the video signal is acquired with the time stamp acquisition unit 41, and transmission delay amounts are calculated with the transmission delay amount calculation unit 410.

In the next step S102, the statistical amount is calculated from a set of the calculated transmission delay amounts. Herein, the transmission delay amount statistical information is calculated by the transmission delay statistics calculation unit 420. The statistical information includes the mean, dispersion, maximum value, minimum value, histogram, and the like of the transmission delay amounts. In step S102, the statistical information of the usage of the transmission delay jitter absorbing buffer is also calculated in addition to the transmission delay amount. As described above, the transmission delay jitter absorbing buffer is a buffer for, when transmission is performed through an asynchronous transmission network, absorbing variations in the transmission delay time. As described above, the statistical information of the buffer usage includes the average usage rate, dispersion, maximum value, minimum value, histogram, and the like of the buffer.

In the next step S103, if the number of the statistical samples is sufficient and is greater than or equal to a predetermined number is determined by the transmission delay statistics calculation unit 420. If the number of the samples is sufficient (is greater than or equal to the predetermined number), the process proceeds to step S104. In step S104, the transmission delay statistical information is displayed on the transmission delay statistics display unit 430. Herein, statistical information such as those shown in FIG. 7 to FIG. 10 is displayed. Meanwhile, if the number of samples is not sufficient (is less than the predetermined number) in step S103, the process terminates.

After step S104, the process proceeds to step S105, and it is determined if there is a high possibility that video distortion may be generated due to a delay. If there is a high possibility that video distortion may be generated, the process proceeds to step S106, and a warning is issued. The warning is issued when it is determined that there is a high possibility that video distortion may be generated on the basis of the transmission delay statistical information. The criteria for issuing a warning includes, for example: a case in which data residing in the jitter absorbing buffer 400 of the receiving device 400 is little, when the packet loss rate becomes greater than or equal to a preset value, and the like. The warning can be displayed on the transmission delay statistics display unit 430 or pronounced with a sound or the like. After step S106, the process proceeds to step S107. Meanwhile, if there is not a high possibility that video distortion may be generated, a warning is not issued in step S106, and the process proceeds to step S107.

In step S107, if the mode is the manual mode is determined. If the mode is the manual mode, the process proceeds to step S108. In step S108, an operation amount input to the phase advancing amount operation unit 440 is acquired. In the next step S109, the phase advancing amount is calculated on the basis of the manual operation amount and the statistical information of the transmission delay amount.

Meanwhile, if the mode is not the manual mode in step S107, that is, if the mode is the automatic mode, the process proceeds to step S111. In step S111, the phase advancing amount is calculated on the basis of the statistical information. After step S109 or S111, the process proceeds to step S110. In step S110, the phase advancing amount is issued to the phase controller 460. After step S111, the process terminates.

FIG. 15 is a flowchart showing a process of determining the method of converting the phase advancing amount when advancing the phase of a synchronization signal. First, in step S201, synchronization signal time conversion is performed with the synchronization signal time conversion unit 470, and a synchronization signal SYNC is converted into time information. In the next step S202, it is determined if the mode is the mode in which the phase advancing amount is gradually changed, and if the mode is the mode in which the phase advancing amount is gradually changed, the process proceeds to step S203. In step S203, the amount of a small change in the phase advancing amount is calculated using Formula 1 described above. After step S203, the process proceeds to step S204, and the next phase advancing amount is calculated. The next phase advancing amount is calculated by adding the amount of a small change to the current phase advancing amount.

Meanwhile, if the mode is not the mode in which the phase advancing amount is gradually changed in step S202, that is, if the mode is the mode in which the phase advancing amount is instantaneously changed, the process proceeds to step S207. In step S207, as the next phase advancing amount, a final value of the phase advancing amount calculated with the phase advancing amount calculation unit is used as a command value.

After step S204 or S207, the process proceeds to step S205. In step S205, the phase of the synchronization signal is advanced by the phase controller 460 on the basis of the phase advancing amount. In the next step S206, the period of the synchronization signal is added to the phase, and the phase information is transmitted to the transmitting device 20. After step S206, the process terminates.

The transmitting device 40 generates a synchronization signal on the transmitter side on the basis of the received phase information, and inputs it to the camera 20. Within the camera 20, the drive frequency of the image pickup device (CCD 22) or the like changes so that video is output in phase with the input synchronization signal.

With the aforementioned steps S101 to S110 and steps S201 to S206 performed repeatedly, the phase advancing amount can be continuously adjusted. Although the processes in steps S102 to S110 are performed within the receiver 40 in the aforementioned description, the processes can be performed outside of the receiving device 40.

As described above, according to Embodiment 2, a user is able to know the video transmission delay status or the buffer usage status by viewing the display of the statistical information. Further, by operating a phase advancing amount adjustment parameter on the basis of such information, the user is able to adjust the delay time and the transmission quality as intended by the user. Further, it is also possible to, by automatically adjusting the phase advancing amount, prevent a buffer overflow or underflow even when the transmission delay amount has changed, whereby a video output can be stabilized.

Although the preferred embodiments of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

REFERENCE SIGNS LIST

10 Camera system
20 Imaging unit
30 Transmitting device
31 Encoder (encoding unit)
32 Time stamp adding unit (time information adding unit)
33 Synchronization signal generation unit
34 Time information storage unit
40 Receiving device
41 Time stamp acquisition unit
42 Decoder (decoding unit)
43 Buffer (synchronization output unit)
44 Delay time calculation unit (transmission delay measuring unit)
45 Synchronization signal time conversion unit (synchronization signal transmission unit)
46 CPU (synchronization signal transmission unit and control unit)
47 Time information storage unit
50 Transmission line
400 Buffer
410 Transmission delay amount calculation unit
420 Transmission delay amount statistics calculation unit
430 Transmission delay statistics display unit
440 Phase advancing amount operation, unit
450 Phase advancing amount calculation unit
460 Phase controller
470 Synchronization signal time conversion unit

The invention claimed is:

1. A receiving device comprising:
a decoding unit that decodes encoded data of video transmitted through a transmission line;
a synchronization output unit that synchronizes video data decoded by the decoding unit with a reference synchronization signal, and outputs the video data;
a transmission delay information acquisition unit that acquires information related to a delay of the transmission line from the input encoded data and time information; and
a synchronization signal transmission unit that determines as a time necessary for transmission a sum of the information related to a delay obtained by the transmission delay information acquisition unit and a delay related to codec processing including decoding processing with the decoding unit, sets the time as a phase difference from the reference synchronization signal, and transmits phase information or time information for generating a synchronization signal that is shifted by the time of the phase difference, through the transmission line.

2. The receiving device according to claim 1, wherein the transmission delay information acquisition unit includes a transmission delay measuring unit that measures a delay time of the transmission line.

3. The receiving device according to claim 2,
wherein the encoded data has time information added thereto, the time information having been sent out to the transmission line,
wherein the transmission delay measuring unit, on the basis of the time information added to the encoded data and time information of when the encoded data was received, performs a process of measuring the delay time of the transmission line a plurality of times, and performs statistical processing on a set of the plurality of measured delay times to determine the time necessary for transmission as an allowable transmission delay time, and
wherein the synchronization signal transmission unit sets the allowable transmission delay time as a phase difference of the synchronization signal as the time necessary for transmission, converts the input reference synchronization signal into time, and transmits time information as the phase information through the transmission line, the time information being for generating a synchronization signal that is advanced by the time of the phase difference necessary for transmission.

4. The receiving device according to claim 1, wherein the synchronization signal transmission unit records time of the input reference synchronization signal for each synchronization pulse, and sends out the time to the transmission line.

5. The receiving device according to claim 1, further comprising a phase control amount calculation unit that determines, on the basis of the information obtained by the transmission delay information acquisition unit, a phase control amount for controlling the phase of the input reference synchronization signal, wherein the synchronization signal transmission unit, on the basis of the phase control amount, controls the phase of the reference synchronization signal, and transmits the controlled phase information through the transmission line.

6. The receiving device according to claim 5, further comprising a statistics calculation unit that calculates statistical information of the information related to a delay of the transmission line, wherein the phase control amount calculation unit determines the phase control amount on the basis of the statistical information.

7. The receiving device according to claim 5, further comprising:
a statistics calculation unit that calculates statistical information of the information related to a delay of the transmission line;
a display unit that displays the statistical information; and
an operation unit that acquires an operation amount, input on the basis of a display of the display unit, wherein
the phase control amount calculation unit determines the phase control amount on the basis of the statistical information and the operation amount.

8. The receiving device according to claim 5, wherein the synchronization signal transmission unit includes a phase controller that controls the phase of the reference synchronization signal on the basis of the phase control amount, and the phase controller controls the phase of the reference synchronization signal such that a target phase control amount is attained in a stepwise manner.

9. The receiving device according to claim 5, wherein the information related to a delay of the transmission line is a delay time of the transmission line or a usage rate of a buffer that stores the encoded data.

10. A camera system comprising:
- an imaging unit that performs imaging to obtain a video signal;
- a transmission line;
- a transmitting device that sends out to the transmission line encoded data of the video signal obtained by imaging with the imaging unit; and
- a receiving device that receives the encoded data,
- wherein the transmitting device includes
    - an encoding unit that converts an input video signal into encoded data, and sends out the encoded data to the transmission line, and
    - a synchronization signal generation unit that generates, on the basis of phase information transmitted through the transmission line, a synchronization signal for adjusting a phase of an input video signal obtained by the imaging unit,
- wherein the phase information includes information indicating that a timing of a synchronization signal generated by the synchronization signal generation unit is to be advanced by a time necessary for transmission,
- wherein the synchronization signal generation unit generates the synchronization signal so that an input video signal is advanced by the time necessary for transmission, and
- wherein the receiving device includes
    - a decoding unit that decodes the encoded data of video transmitted through the transmission line,
    - a synchronization output unit that synchronizes video data decoded by the decoding unit with a reference synchronization signal and outputs the video data,
    - a transmission delay information acquisition unit that acquires information related to a delay of the transmission line from the input encoded data and time information, and
    - a synchronization signal transmission unit that determines as the time necessary for transmission a sum of the information related to a delay obtained by the transmission delay information acquisition unit and a codec-related delay, sets the time as a phase difference from the reference synchronization signal, and transmits phase information or time information for generating a synchronization signal that is shifted by the time of the phase difference, through the transmission line.

11. The camera system according to claim 10,
wherein the synchronization signal generation unit generates the synchronization signal so that an input video signal is advanced by the time necessary for transmission, and
wherein the transmission delay information acquisition unit includes a transmission delay measuring unit that measures a delay time of the transmission line.

12. The camera system according to claim 10,
wherein the receiving device further includes a phase control amount calculation unit that determines, on the basis of the information obtained by the transmission delay information acquisition unit, a phase control amount for controlling the phase of the input reference synchronization signal, and
wherein the synchronization signal transmission unit controls the phase of the reference synchronization signal on the basis of the phase control amount, and transmits the controlled phase information through the transmission line.

13. The camera system according to claim 12,
wherein the receiving device further includes a statistics calculation unit that calculates statistical information of the information related to a delay of the transmission line, and
wherein the phase control amount calculation unit determines the phase control amount on the basis of the statistical information.

14. The camera system according to claim 12,
wherein the receiving device further includes
- a statistics calculation unit that calculates statistical information of the information related to a delay of the transmission line,
- a display unit that displays the statistical information, and
- an operation unit that acquires an operation amount input on the basis of a display of the display unit, and
wherein the phase control amount calculation unit determines the phase control amount on the basis of the statistical information and the operation amount.

15. The camera system according to claim 11,
wherein the transmitting device further includes a time information adding unit that adds to the encoded data time information to be sent out to the transmission line, and
wherein the transmission delay measuring unit of the receiving device, on the basis of the time information added to the encoded data and time information of when the encoded data was received, performs a process of measuring the delay time of the transmission line a plurality of times, and performs statistical processing on a set of the plurality of measured delay times to determine the time necessary for transmission as an allowable transmission delay time.

* * * * *